(12) United States Patent
Hatakeyama et al.

(10) Patent No.: US 11,267,315 B2
(45) Date of Patent: Mar. 8, 2022

(54) AIR-CONDITIONING DEVICE

(71) Applicant: Marelli Corporation, Saitama (JP)

(72) Inventors: Jun Hatakeyama, Saitama (JP);
Satoshi Ogihara, Saitama (JP);
Tatsuya Osaki, Saitama (JP);
Tomohiro Maeda, Saitama (JP);
Mitsuaki Nagata, Saitama (JP);
Yasuhito Ookawara, Saitama (JP)

(73) Assignee: Marelli Cabin Comfort Japan Corporation, Saitama (JP)

( * ) Notice: Subject to any disclaimer, the term of this patent is extended or adjusted under 35 U.S.C. 154(b) by 217 days.

(21) Appl. No.: 16/651,771

(22) PCT Filed: Sep. 14, 2018

(86) PCT No.: PCT/JP2018/034283
§ 371 (c)(1),
(2) Date: Mar. 27, 2020

(87) PCT Pub. No.: WO2019/069666
PCT Pub. Date: Apr. 11, 2019

(65) Prior Publication Data
US 2020/0254846 A1     Aug. 13, 2020

(30) Foreign Application Priority Data

Oct. 2, 2017  (JP) .............................. JP2017-193009
Nov. 17, 2017 (JP) .............................. JP2017-221741
Mar. 9, 2018  (JP) .............................. JP2018-043559

(51) Int. Cl.
*B60H 1/00*   (2006.01)
*B60H 1/22*   (2006.01)
(Continued)

(52) U.S. Cl.
CPC ........... *B60H 1/00785* (2013.01); *B60H 1/00* (2013.01); *B60H 1/00428* (2013.01);
(Continued)

(58) Field of Classification Search
CPC ........ B60H 1/00785; B60H 1/00; B60H 1/22; B60H 1/3207; B60H 3/024;
(Continued)

(56) References Cited

U.S. PATENT DOCUMENTS 5,299,431 A   4/1994 Iritani et al.
6,237,351 B1  5/2001 Itoh et al.
(Continued)

FOREIGN PATENT DOCUMENTS

DE   112014003874 T5   5/2016
JP      H05319077 A    12/1993
(Continued)

*Primary Examiner* — Ljiljana V. Ciric
(74) *Attorney, Agent, or Firm* — Young Basile Hanlon & MacFarlane, P.C.

(57) ABSTRACT

An air-conditioning device includes: a compressor; an outdoor heat exchanger; an evaporating unit configured to evaporate refrigerant a heater unit configured to heat the air by using the heat of the refrigerant a liquid receiver arranged at the downstream side of the outdoor heat exchanger and a restrictor mechanism provided between the heater unit and the outdoor heat exchanger, wherein, in an operation state in which the flow of the refrigerant is restricted by the restrictor mechanism and heat is released in the heater unit, a first operation mode and a second operation mode are switched, the first operation mode being set such that the liquid-phase refrigerant is stored in the liquid receiver and the gaseous-phase refrigerant is guided to the compressor and the second operation mode being set such that the liquid-phase refrigerant stored in the liquid receiver is guided to the evaporating unit.

20 Claims, 16 Drawing Sheets

(51) Int. Cl.
  *B60H 3/02* (2006.01)
  *F25B 43/00* (2006.01)
  *B60H 1/32* (2006.01)
  *F25B 40/00* (2006.01)
  *F25B 49/02* (2006.01)
  *F25B 41/20* (2021.01)
  *F25B 6/04* (2006.01)
  *F25B 41/39* (2021.01)
  *F25B 5/04* (2006.01)

(52) U.S. Cl.
  CPC ..... *B60H 1/00907* (2013.01); *B60H 1/00921* (2013.01); *B60H 1/22* (2013.01); *B60H 1/3207* (2013.01); *B60H 1/3213* (2013.01); *B60H 3/024* (2013.01); *F25B 5/04* (2013.01); *F25B 6/04* (2013.01); *F25B 40/00* (2013.01); *F25B 41/20* (2021.01); *F25B 41/39* (2021.01); *F25B 43/00* (2013.01); *F25B 49/02* (2013.01); *B60H 2001/00961* (2019.05); *F25B 2339/047* (2013.01); *F25B 2400/0409* (2013.01); *F25B 2400/0411* (2013.01); *F25B 2400/121* (2013.01); *F25B 2400/23* (2013.01); *F25B 2600/2501* (2013.01); *F25B 2600/2519* (2013.01); *F25B 2700/11* (2013.01); *F25B 2700/2106* (2013.01); *F25B 2700/21163* (2013.01); *F25B 2700/21171* (2013.01); *F25B 2700/21175* (2013.01)

(58) Field of Classification Search
  CPC ...... B60H 2001/00961; B60H 1/00428; B60H 1/00907; B60H 1/00921; B60H 1/3213; B60H 1/3229; F25B 41/20; F25B 43/00; F25B 49/02; F25B 2400/23; F25B 2700/11; F25B 5/04; F25B 6/04; F25B 40/00; F25B 41/39; F25B 2339/047; F25B 2400/0409; F25B 2400/0411; F25B 2400/121; F25B 2600/2501; F25B 2600/2519; F25B 2700/2106; F25B 2700/21163; F25B 2700/21171; F25B 2700/21175
  See application file for complete search history.

(56) References Cited

U.S. PATENT DOCUMENTS

| | | | | |
|---|---|---|---|---|
| 8,419,512 | B2* | 4/2013 | Creed | B60H 1/00907 454/139 |
| 8,966,928 | B2* | 3/2015 | Oomura | F25B 30/02 62/393 |
| 9,250,005 | B2* | 2/2016 | Oomura | F25D 21/004 |
| 9,517,680 | B2* | 12/2016 | Suzuki | B60H 1/00392 |
| 9,573,439 | B2* | 2/2017 | Misumi | B60H 3/0085 |
| 9,643,470 | B2* | 5/2017 | Suzuki | B60H 1/00485 |
| 9,849,752 | B2* | 12/2017 | Suzuki | B60H 1/00485 |
| 9,855,822 | B2* | 1/2018 | Suzuki | B60H 1/00335 |
| 9,925,877 | B2* | 3/2018 | Miyakoshi | B60L 1/003 |
| 10,183,551 | B2* | 1/2019 | Suzuki | B60H 1/0075 |
| 10,189,332 | B2* | 1/2019 | Miyakoshi | B60H 1/2218 |
| 10,266,035 | B2* | 4/2019 | Katoh | B60H 1/00921 |
| 10,293,661 | B2* | 5/2019 | Miyakoshi | B60H 1/2221 |
| 10,533,786 | B2* | 1/2020 | Tada | F25B 41/40 |
| 10,994,589 | B2* | 5/2021 | Takeuchi | B60L 3/0046 |
| 11,097,599 | B2* | 8/2021 | Miyakoshi | B60H 1/22 |
| 2001/0035286 | A1* | 11/2001 | Kobayashi | B61D 27/00 165/202 |
| 2010/0326127 | A1* | 12/2010 | Oomura | F25B 41/20 62/498 |
| 2011/0016896 | A1* | 1/2011 | Oomura | B60H 1/00921 62/155 |
| 2012/0227428 | A1* | 9/2012 | Yokoo | B60H 1/00921 62/126 |
| 2012/0240607 | A1* | 9/2012 | Misumi | B60H 3/0085 62/126 |
| 2013/0081419 | A1* | 4/2013 | Katoh | B60H 1/004 62/278 |
| 2013/0186131 | A1 | 7/2013 | Guitar | |
| 2013/0291577 | A1* | 11/2013 | Miyakoshi | B60H 1/00785 62/151 |
| 2013/0312442 | A1* | 11/2013 | Suzuki | B60H 1/00921 62/160 |
| 2014/0026601 | A1* | 1/2014 | Chen | F25D 21/002 62/81 |
| 2014/0102666 | A1* | 4/2014 | Ichishi | B60H 1/00921 165/11.1 |
| 2014/0223943 | A1* | 8/2014 | Ichishi | B60H 1/3205 62/215 |
| 2015/0040594 | A1* | 2/2015 | Suzuki | B60H 1/00335 62/159 |
| 2015/0059375 | A1* | 3/2015 | Oomura | F25B 30/02 62/155 |
| 2015/0260439 | A1* | 9/2015 | Ohta | F16K 15/00 62/196.1 |
| 2015/0283872 | A1 | 10/2015 | Miyakoshi et al. | |
| 2016/0003499 | A1* | 1/2016 | Park | F25B 41/20 62/115 |
| 2016/0059666 | A1* | 3/2016 | Chen | F28F 9/0273 62/238.7 |
| 2016/0193896 | A1 | 7/2016 | Miyakoshi et al. | |
| 2016/0257179 | A1* | 9/2016 | Miyakoshi | B60L 1/003 |
| 2016/0288618 | A1* | 10/2016 | Katoh | B60H 1/00921 |
| 2016/0297284 | A1* | 10/2016 | Miyakoshi | B60H 1/00864 |
| 2016/0375743 | A1* | 12/2016 | Suzuki | B60H 1/00335 62/159 |
| 2017/0028815 | A1* | 2/2017 | Suzuki | F25B 49/027 |
| 2017/0028816 | A1* | 2/2017 | Suzuki | B60H 1/04 |
| 2017/0028817 | A1* | 2/2017 | Suzuki | B60H 1/3207 |
| 2017/0057320 | A1 | 3/2017 | Song et al. | |
| 2017/0080777 | A1* | 3/2017 | Suzuki | B60H 1/00335 |
| 2017/0267063 | A1 | 9/2017 | Shan | |
| 2017/0368940 | A9* | 12/2017 | Miyakoshi | B60L 1/02 |
| 2018/0208020 | A1* | 7/2018 | Miyakoshi | B60H 1/2218 |
| 2018/0222289 | A1 | 8/2018 | Kawakubo et al. | |
| 2019/0070929 | A1 | 3/2019 | Nakamura et al. | |
| 2019/0107314 | A1* | 4/2019 | Watanabe | F24F 11/72 |
| 2019/0241044 | A1* | 8/2019 | Ito | B60H 1/00899 |
| 2019/0285318 | A1* | 9/2019 | Kopko | F25B 40/00 |
| 2019/0301776 | A9* | 10/2019 | Feria | F25B 40/04 |
| 2019/0316822 | A1* | 10/2019 | Tada | B60H 1/22 |
| 2019/0353407 | A1* | 11/2019 | Miyakoshi | B60H 1/00921 |
| 2020/0011580 | A1* | 1/2020 | Matsuda | F25B 13/00 |
| 2020/0132349 | A1* | 4/2020 | Hong | C21D 9/08 |
| 2020/0158370 | A1* | 5/2020 | Lu | F25B 49/02 |
| 2020/0166257 | A1* | 5/2020 | Wada | F25B 13/00 |
| 2020/0173682 | A1* | 6/2020 | Shimazu | F24F 1/32 |
| 2020/0254846 | A1* | 8/2020 | Hatakeyama | B60H 1/00921 |
| 2020/0256590 | A1* | 8/2020 | Nishiyama | F25B 41/31 |
| 2020/0271344 | A1* | 8/2020 | Ikeda | F25B 41/22 |
| 2021/0131689 | A1* | 5/2021 | Hancock | F24F 11/65 |

FOREIGN PATENT DOCUMENTS

| | | |
|---|---|---|
| JP | H0699729 A | 4/1994 |
| JP | H10-297270 A | 11/1998 |
| JP | 2000-161809 A | 6/2000 |
| JP | 2001-50572 A | 2/2001 |
| JP | 2004-155344 A | 6/2004 |
| JP | 2012-20599 A | 2/2012 |
| JP | 2012-30734 A | 2/2012 |
| JP | 2013-148229 A | 8/2013 |
| JP | 2013-535372 A | 9/2013 |
| JP | 2014-9868 A | 1/2014 |
| JP | 2014-94671 A | 5/2014 |
| JP | 2017-171284 A | 9/2017 |
| JP | 2017165139 A | 9/2017 |

(56) References Cited

FOREIGN PATENT DOCUMENTS

WO 2011/155204 A1 12/2011
WO 2017/022487 A1 2/2017

\* cited by examiner

AIR-CONDITIONING DEVICE

CROSS-REFERENCE TO RELATED APPLICATIONS

The present application claims priority to Japanese Patent Application No. 2017-193009 filed on Oct. 2, 2017, Japanese Patent Application No. 2017-221741 filed on Nov. 17, 2017, and Japanese Patent Application No. 2018-043559 filed on Mar. 9, 2018, the entire contents of which are incorporated into this specification by reference.

TECHNICAL FIELD

The present invention relates to an air-conditioning device.

BACKGROUND

JP2013-535372A discloses an air-conditioning device capable of switching a cabin-cooling operation and a cabin-heating operation by switching a flow of refrigerant in a refrigeration cycle. In this air-conditioning device, the cabin-cooling operation is operated by switching the refrigeration cycle to a cabin-cooling mode, and the cabin-heating operation is operated by switching the refrigeration cycle to a heat pump cabin-heating mode.

SUMMARY

However, in the air-conditioning device disclosed in JP2013-535372A, in order to perform a dehumidification, it is necessary to switch the refrigeration cycle to the cabin-cooling mode.

An object of the present invention is to provide an air-conditioning device capable of executing a dehumidifying cabin-heating operation in which a dehumidification is performed while maintaining a cabin-heating state.

According to an aspect of the present invention, the air-conditioning device mounted on a vehicle includes: a compressor configured to compress a refrigerant; an outdoor heat exchanger configured to perform heat exchange between the refrigerant and outside air; an evaporating unit configured to evaporate the refrigerant by causing the refrigerant to absorb heat of air to be guided to a vehicle cabin of the vehicle; a heater unit configured to heat the air to be guided to the vehicle cabin by using the heat of the refrigerant compressed by the compressor; a liquid receiver arranged at a downstream side of the outdoor heat exchanger, the liquid receiver being configured to separate the refrigerant guided from the outdoor heat exchanger into a liquid-phase refrigerant and a gaseous-phase refrigerant and to store the liquid-phase refrigerant; a restrictor mechanism provided between the heater unit and the outdoor heat exchanger, the restrictor mechanism being configured to cause the refrigerant to be decompressed and expanded; and an expansion valve provided between the outdoor heat exchanger and the evaporating unit, the expansion valve being configured to cause the refrigerant that has passed through the outdoor heat exchanger to be decompressed and expanded; wherein in an operation state in which a flow of the refrigerant is restricted by the restrictor mechanism and heat is released in the heater unit, a first operation mode and a second operation mode are switched, the first operation mode being set such that the liquid-phase refrigerant is stored in the liquid receiver and the gaseous-phase refrigerant is guided to the compressor and the second operation mode being set such that the liquid-phase refrigerant stored in the liquid receiver is guided to the evaporating unit.

In the above-described embodiment, in the operation state in which the flow of the refrigerant is restricted by the restrictor mechanism and the heat is released in the heater unit, the first operation mode and the second operation mode are switched. In the first operation mode, the liquid-phase refrigerant obtained from the refrigerant guided from the outdoor heat exchanger is stored in the liquid receiver while performing a cabin-heating operation. In the second operation mode, the liquid-phase refrigerant stored in the liquid receiver in the first operation mode is guided to the evaporating unit. Thus, by switching the first operation mode and the second operation mode, it is possible to perform dehumidification by storing the liquid-phase refrigerant in the liquid receiver and using this liquid-phase refrigerant while performing the cabin-heating operation. Therefore, it is possible to perform the dehumidifying cabin-heating operation in which the dehumidification is performed while maintaining the cabin-heating state.

DETAILED DESCRIPTION

Embodiments of the present invention will be described below with reference to the drawings.

First Embodiment

An air-conditioning device 100 according to a first embodiment of the present invention will be described below with reference to FIGS. 1 to 13.

A configuration of the air-conditioning device 100 will be described first with reference to FIGS. 1 to 3.

Figure 1:
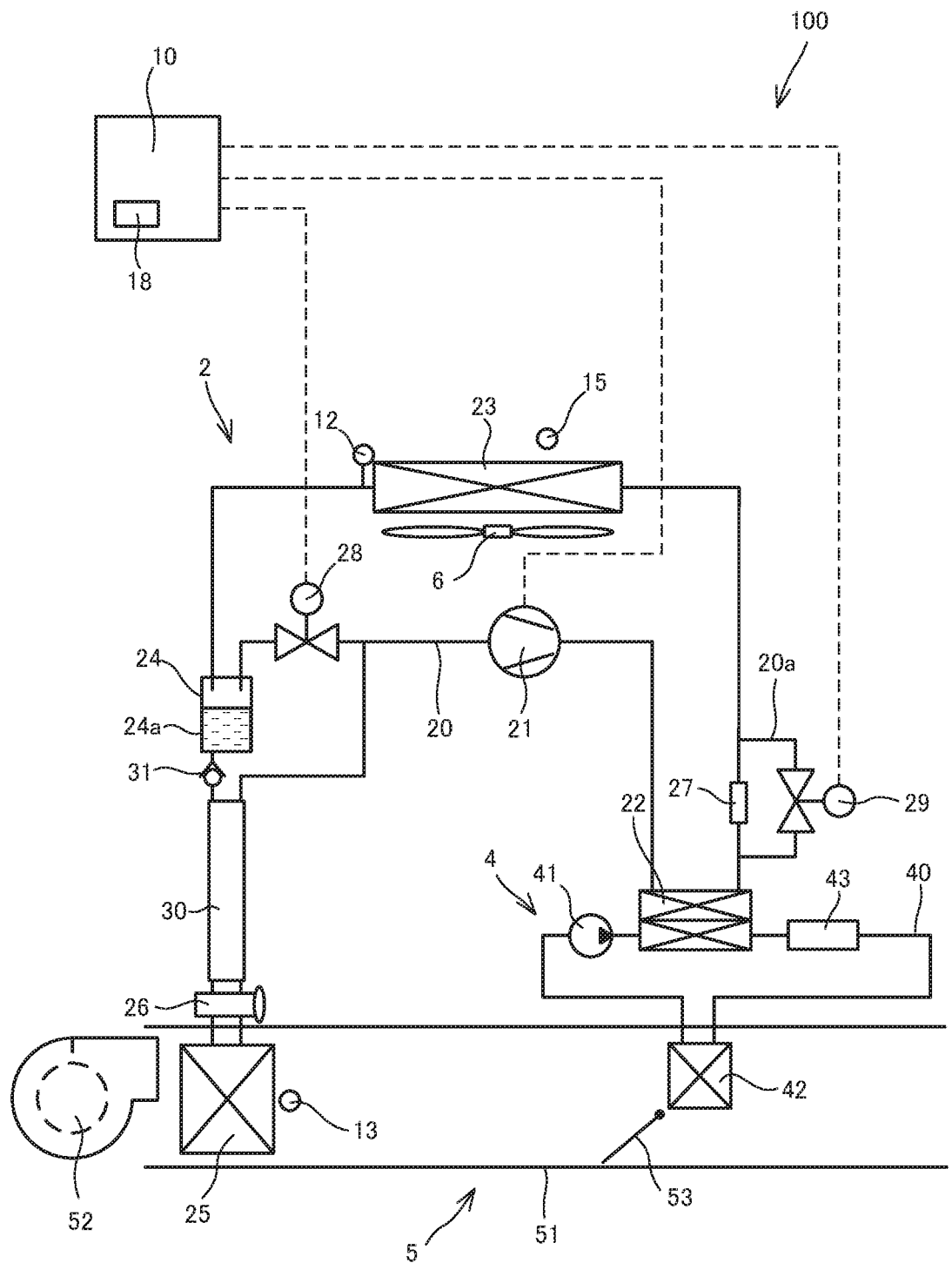
FIG. 1 is a configuration diagram of an air-conditioning device according to a first embodiment of the present invention.

As shown in FIG. 1, the air-conditioning device 100 is provided with a refrigeration cycle 2 through which a refrigerant circulates, a hot-water cycle 4 through which hot water circulates, an HVAC (Heating Ventilation and Air Conditioning) unit 5 through which air used for air-conditioning passes, and a controller 10 serving as a control unit that controls operation of the air-conditioning device 100.

The air-conditioning device 100 is a heat pump system capable of performing cabin cooling and cabin heating. The air-conditioning device 100 is mounted on a vehicle (not shown) and performs air-conditioning in a vehicle cabin (not shown). For example, HFO-1234yf is used as the refrigerant, and an antifreeze is used as the hot water.

The refrigeration cycle 2 is provided with a compressor 21 serving as a compressor, a fluid-cooled condenser 22 serving as a hot-water-refrigerant heat exchanger, an outdoor heat exchanger 23, a liquid receiver 24, an internal heat exchanger 30, an evaporator 25 serving as an evaporating unit, a thermostatic expansion valve 26 serving as an expansion valve, a fixed restrictor 27 serving as a restrictor mechanism, a bypass channel 20a that allows flow of the refrigerant bypassing the fixed restrictor 27, a second flow-path switching valve 29 that opens/closes the bypass channel 20a, and a refrigerant flow path 20 that connects these components such that the refrigerant can circulates therethrough. The refrigerant flow path 20 is provided with a first flow-path switching valve 28.

The compressor 21 sucks and compresses gaseous-state (gaseous-phase) refrigerant. Thus, the temperature and the pressure of the gaseous-state refrigerant become high.

The fluid-cooled condenser 22 functions as, at the time of a cabin-heating operation, a condenser with which the refrigerant that has passed through the compressor 21 is condensed. The fluid-cooled condenser 22 performs heat exchange between the refrigerant the temperature and the pressure of which have been increased by the compressor 21 and the hot water circulating through the hot-water cycle 4, thereby transferring the heat of the refrigerant to the hot water. The refrigerant that has been condensed in the fluid-cooled condenser 22 flows to the fixed restrictor 27.

The fluid-cooled condenser 22 uses the heat of the refrigerant that has been compressed by the compressor 21 to heat air that is to be guided into the vehicle cabin and used for the air-conditioning via the hot water circulating through the hot-water cycle 4. In this configuration, the fluid-cooled condenser 22 and the hot-water cycle 4 correspond to a heater unit for heating the air to be guided into the vehicle cabin. Instead of this configuration, as shown in FIG. 2, it may be configured such that the refrigerant that has been compressed by the compressor 21 is guided to a heater core 42 directly without providing the hot-water cycle 4. In this case, the heater core 42 corresponds to the heater unit.

The outdoor heat exchanger 23 is arranged in an engine compartment of the vehicle (in a motor compartment in a case of an electric car), for example, and performs the heat exchange between the refrigerant and outside air. The outdoor heat exchanger 23 functions as the condenser at the time of a cabin-cooling operation and functions as an evaporating unit at the time of the cabin-heating operation. The outside air is introduced into the outdoor heat exchanger 23 as the vehicle is traveled or as an outdoor fan 6 is rotated.

Figure 3:
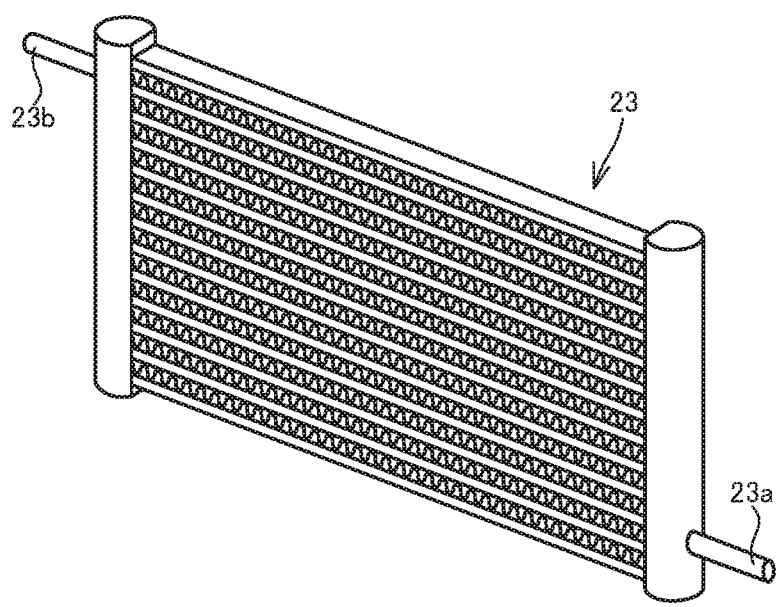
FIG. 3 is a perspective view of an outdoor heat exchanger.

As shown in FIG. 3, the outdoor heat exchanger 23 has a refrigerant inlet 23a through which the refrigerant is lead thereinto and a refrigerant outlet 23b through which the refrigerant is lead out from the outdoor heat exchanger 23. Here, the refrigerant outlet 23b is provided at a position higher than the refrigerant inlet 23a. In other words, in the outdoor heat exchanger 23, the refrigerant is lead into the outdoor heat exchanger 23 from a lower level, ascends upwards in the interior thereof, and is lead out from a higher level. With such a configuration, at the time of the cabin-heating operation, when the heat exchange between the outside air and the refrigerant is performed in the outdoor heat exchanger 23, the refrigerant, which has not been evaporated (the refrigerant with high humidity), in the outdoor heat exchanger 23 is less likely to be lead out therefrom, and an amount of heat absorbed from the outside air is increased.

The liquid receiver 24 is disposed on the downstream side of the outdoor heat exchanger 23 so as to allow the refrigerant to be guided-in from the outdoor heat exchanger 23 and to perform gas/liquid separation into a liquid-state (liquid phase) refrigerant and the gaseous-state refrigerant. The liquid receiver 24 has a liquid reservoir 24a that stores the liquid-state refrigerant, an outlet that leads the liquid-state refrigerant to the evaporator 25, and an outlet that leads the gaseous-state refrigerant to the compressor 21. In FIG. 1, a passage that guides the gaseous-state refrigerant to the compressor 21 is configured such that the oil contained in the circuit can return; however, an illustration thereof is omitted as FIG. 1 is a conceptual diagram.

At the time of the cabin-heating operation, the liquid receiver 24 guides the gaseous-state refrigerant, which has entered from the outdoor heat exchanger 23, to the compressor 21. From the liquid receiver 24 to the compressor 21, only a flow of the separated gaseous-state refrigerant is allowed. At the time of the cabin-cooling operation, the liquid receiver 24 stores the liquid-state refrigerant, which has entered from the outdoor heat exchanger 23, and guides a part of the liquid-state refrigerant to the evaporator 25 through the internal heat exchanger 30 and the thermostatic expansion valve 26. From the liquid receiver 24 to the evaporator 25, only a flow of the separated liquid-state refrigerant is allowed.

A differential pressure regulating valve 31 is provided between the liquid receiver 24 and the thermostatic expansion valve 26. The differential pressure regulating valve 31 is provided on the upstream side of the internal heat exchanger 30. The differential pressure regulating valve 31 is opened when the pressure at the upstream side of the differential pressure regulating valve 31 exceeds a set pressure. The set pressure is set in advance such that the differential pressure regulating valve 31 is not opened at the time of the cabin-heating operation and that the differential pressure regulating valve 31 is opened only at the time of the cabin-cooling operation. By providing the differential pressure regulating valve 31, it is possible to prevent the refrigerant from flowing into the evaporator 25 from the liquid receiver 24 through the thermostatic expansion valve 26 at the time of the cabin-heating operation. Thus, it is possible to prevent the evaporator 25 from being frozen and to prevent a lubricating oil flowing in the refrigerant flow path 20 from being stored in the evaporator 25. Note that, the differential pressure regulating valve 31 may be provided between the internal heat exchanger 30 and the thermostatic expansion valve 26.

The evaporator 25 is arranged in the HVAC unit 5. In a case in which an operation mode of the refrigeration cycle 2 is a cabin-cooling mode or a dehumidifying cabin-heating mode, the evaporator 25 evaporates the refrigerant by causing the refrigerant to absorb the heat of the air to be guided to the vehicle cabin. The refrigerant that has been evaporated in the evaporator 25 flows into the compressor 21 through the internal heat exchanger 30.

The thermostatic expansion valve 26 is arranged between the internal heat exchanger 30 and the evaporator 25 and causes the liquid-state refrigerant that has been guided from the outdoor heat exchanger 23 through the liquid receiver 24 and the internal heat exchanger 30 to be decompressed and expanded. The thermostatic expansion valve 26 automatically adjusts its opening degree depending on the temperature of the refrigerant that has passed through the evaporator 25, in other words, depending on degree of superheating of the gaseous-state refrigerant.

When the load of the evaporator 25 is increased, the degree of superheating of the gaseous-state refrigerant is increased. As a result, the opening degree of the thermostatic expansion valve 26 is increased to increase the amount of the refrigerant so as to adjust the degree of superheat. On the other hand, when the load of the evaporator 25 is decreased, the degree of superheating of the gaseous-state refrigerant is decreased. As a result, the opening degree of the thermostatic expansion valve 26 is decreased to reduce the amount of the refrigerant so as to adjust the degree of superheat. As described above, the thermostatic expansion valve 26 performs feedback of the temperature of the gaseous-state refrigerant that has passed through the evaporator 25, thereby adjusting the opening degree such that the gaseous-state refrigerant has a suitable degree of superheat.

The internal heat exchanger 30 performs the heat exchange between the refrigerant on the upstream side of the thermostatic expansion valve 26 and the refrigerant on the downstream side of the evaporator 25 by using the temperature difference therebetween.

The fixed restrictor 27 is arranged between the fluid-cooled condenser 22 and the outdoor heat exchanger 23 and causes the refrigerant that has been compressed in the compressor 21 and condensed in the fluid-cooled condenser 22 to be decompressed and expanded. As the fixed restrictor 27, for example, an orifice or a capillary tube is used. An amount of restriction by the fixed restrictor 27 is preset so as to cope with specific operation conditions that are used frequently.

Figure 2:
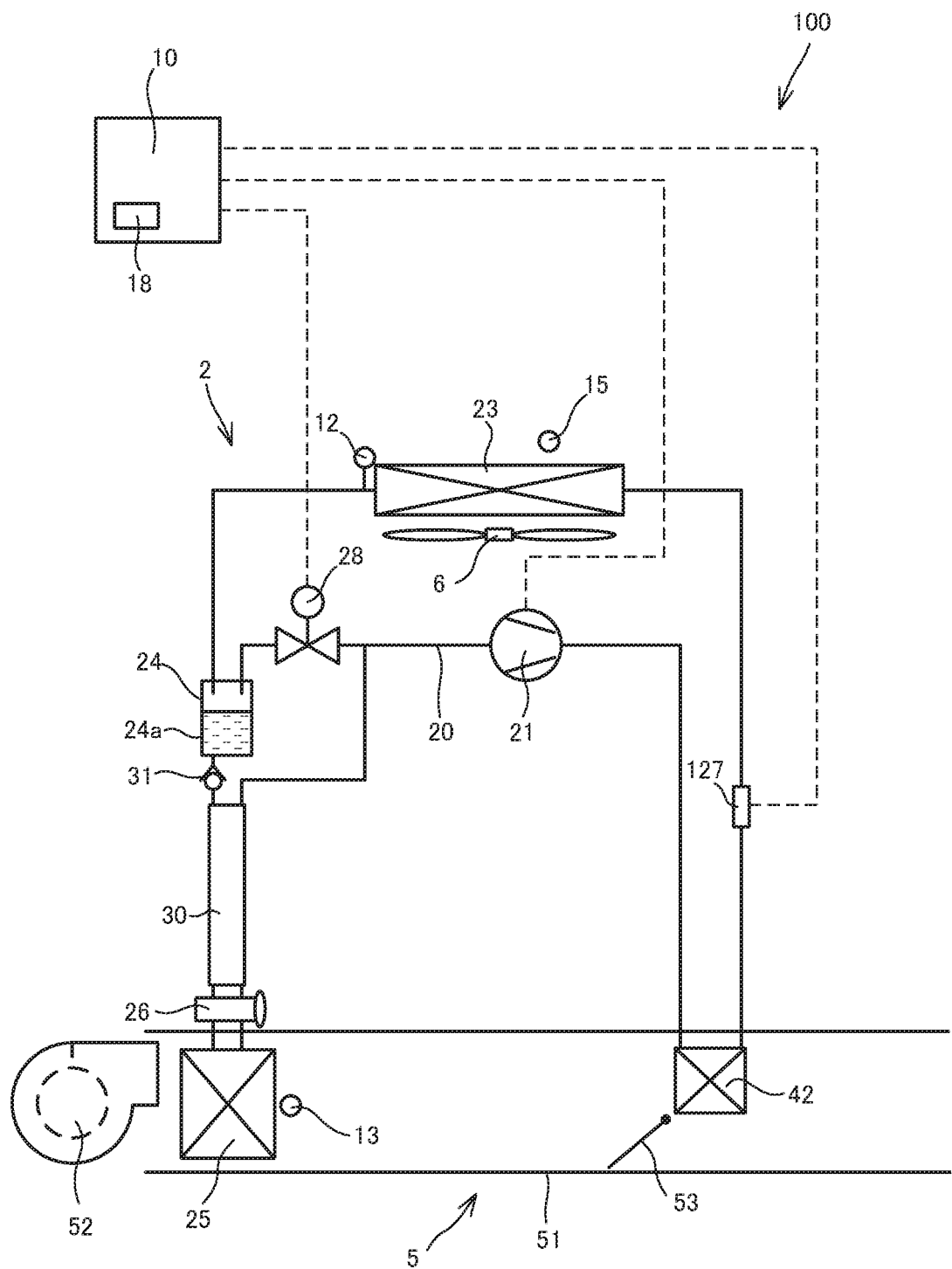
FIG. 2 is a configuration diagram of the air-conditioning device according to a modification of the first embodiment of the present invention.

As shown in FIG. 2, instead of employing the fixed restrictor 27, for example, a solenoid restrictor valve 127 serving as an electrical restrictor mechanism, which has at least a fully opened state and a predetermined restricted state and is capable of performing stepwise or seamless adjustment of the opening degree, may be employed as a variable restrictor (the restrictor mechanism). In this case, there is no need to provide the bypass channel 20a. At the time of the cabin-cooling operation, the solenoid restrictor valve 127 is adjusted such that the flow of the refrigerant is not restricted, and at the time of the cabin-heating operation, the solenoid restrictor valve 127 is adjusted such that the flow of the refrigerant is restricted.

The first flow-path switching valve 28 switches the flows of the refrigerant by being opened/closed. The first flow-path switching valve 28 is a solenoid valve having a solenoid controlled by the controller 10.

At the time of the cabin-cooling operation, the first flow-path switching valve 28 is closed. By doing so, the refrigerant that has been condensed in the outdoor heat exchanger 23 flows into the liquid receiver 24. Then, the pressure at the upstream side of the differential pressure regulating valve 31 exceeds the set pressure, and the liquid-state refrigerant is guided into the compressor 21 by passing through the internal heat exchanger 30, the thermostatic expansion valve 26, and the evaporator 25. On the other hand, at the time of the cabin-heating operation, the first flow-path switching valve 28 is opened. By doing so, the refrigerant that has been evaporated in the outdoor heat exchanger 23 flows into the liquid receiver 24, and is guided to the compressor 21 by passing through the first flow-path switching valve 28. Thus, at the time of the cabin-heating operation, the refrigerant flows by bypassing the internal heat exchanger 30, the thermostatic expansion valve 26, and the evaporator 25.

The second flow-path switching valve 29 switches the flows of the refrigerant by being opened/closed. The second flow-path switching valve 29 is the solenoid valve having the solenoid controlled by the controller 10.

At the time of the cabin-cooling operation, the second flow-path switching valve 29 is opened. By doing so, the refrigerant that has been compressed in the compressor 21 passes through the fluid-cooled condenser 22, and thereafter, flows into the outdoor heat exchanger 23 by bypassing the fixed restrictor 27. On the other hand, at the time of the cabin-heating operation, the second flow-path switching valve 29 is closed. By doing so, the refrigerant that has been compressed in the compressor 21 passes through the fluid-cooled condenser 22 and the fixed restrictor 27 and flows into the outdoor heat exchanger 23.

The hot-water cycle 4 is provided with a water pump 41 serving as a pump, the heater core 42, a hot water heater 43 serving as an auxiliary heating device, the fluid-cooled condenser 22, and a hot water flow path 40 that connects these components such that the hot water can circulates therethrough.

The water pump 41 causes the hot water to circulates through the hot water flow path 40.

The heater core 42 is arranged in the HVAC unit 5 and heats the air to be used for the air-conditioning by the heat exchange between the air passing along the heater core 42 and the hot water at the time of the cabin-heating operation.

The hot water heater 43 assists heating of the air to be guided to the vehicle cabin. The hot water heater 43 has a heater (not shown) inside thereof, and heats the hot water by using an external power. As the heater, for example, a sheathed heater or a PTC (Positive Temperature Coefficient) heater is employed.

Instead of employing the hot water heater 43, it may be possible to employ, for example, an air heater (not shown) that directly heats the air to be guided to the vehicle cabin, or a hot-water heat exchanger (not shown) that heats the air to be guided to the vehicle cabin by using exhaust heat of an engine (not shown) as an internal combustion engine of the vehicle. In addition, any one of the hot water heater 43, the air heater, and the hot-water heat exchanger may be used alone, or they may be used in any combination.

The HVAC unit 5 cools or heats the air to be used for the air-conditioning. The HVAC unit 5 is provided with a blower 52, an air mix door 53, and a case 51 that surrounds these components such that the air to be used for the air-conditioning can pass through. The evaporator 25 and the heater core 42 are arranged in the HVAC unit 5. The air sent from the blower 52 is subjected to the heat exchange with the refrigerant flowing in the evaporator 25 and the hot water flowing in the heater core 42.

The blower 52 is an air blower that sends the air into the HVAC unit 5.

The air mix door 53 adjusts the amount of the air passing along the heater core 42 arranged in the HVAC unit 5. The air mix door 53 is arranged on the blower 52 side of the heater core 42. At the time of the cabin-heating operation, the air mix door 53 opens the heater core 42 side, and closes the heater core 42 side at the time of the cabin-cooling operation. The amount of heat exchange between the air and the hot water in the heater core 42 is adjusted by an opening degree of the air mix door 53.

In the air-conditioning device 100, an outdoor-heat-exchanger-outlet temperature sensor 12 serving as a refrigerant temperature detector, an evaporator temperature sensor 13 serving as an evaporating unit temperature detector, and an outside temperature sensor 15 serving as an outside-air temperature detector are arranged.

The outdoor-heat-exchanger-outlet temperature sensor 12 is provided in the outlet of the outdoor heat exchanger 23 and detects the temperature of the refrigerant in the refrigerant flow path 20. The outdoor-heat-exchanger-outlet temperature sensor 12 detects the temperature of the refrigerant that has passed through the outdoor heat exchanger 23.

The outside temperature sensor 15 detects the temperature of the outside air before being taken into and passing through the outdoor heat exchanger 23.

The evaporator temperature sensor 13 is arranged at the downstream side of the evaporator 25 in the HVAC unit 5 along the air flow and detects the temperature of the air that has passed along the evaporator 25. Note that, the evaporator temperature sensor 13 may be provided directly on the evaporator 25.

The controller 10 is a microcomputer that is configured with a CPU (Central Processing Unit), a ROM (Read Only Memory), a RAM (Random Access Memory), and so forth. The controller 10 may also be configured with a plurality of microcomputers. With the controller 10, various functions of the air-conditioning device 100 are exhibited by reading out programs stored in the ROM with the CPU.

The controller 10 is programed so as to execute control of the refrigeration cycle 2. Signals from the outdoor-heat-exchanger-outlet temperature sensor 12, the evaporator temperature sensor 13, and the outside temperature sensor 15 are input to the controller 10. Note that, signals from other sensors, which are not shown, may be input to the controller 10.

The controller 10 performs the control of the refrigeration cycle 2 on the basis of the input signals. In other words, as shown by broken lines in FIG. 1, the controller 10 sets output of the compressor 21 and performs open/close control of the first flow-path switching valve 28 and the second flow-path switching valve 29. In addition, the controller 10 also performs control of the hot-water cycle 4 and the HVAC unit 5 by sending output signals (not shown).

In addition, the controller 10 has a frost formation determination unit 18 that determines that a frost formation has been caused on the outdoor heat exchanger 23.

In a case in which there is a divergence between the temperature of the refrigerant at the outlet of the outdoor heat exchanger 23 and the outside temperature, the frost formation determination unit 18 determines that the heat exchange between the refrigerant and the outside air cannot be performed sufficiently in the outdoor heat exchanger 23 and that the frost formation has been caused.

Specifically, the frost formation determination unit 18 compares the detected temperature of the outside temperature sensor 15 and the detected temperature of the outdoor-heat-exchanger-outlet temperature sensor 12, and determines that the temperature difference between the both has become equal to or greater than a frost-forming temperature difference with which the frost formation may be caused on the outdoor heat exchanger 23. The frost formation determination unit 18 determines that the frost formation has been caused on the outdoor heat exchanger 23 on the basis of an elapsed time of a state at which the temperature difference between the detected temperature of the outside temperature sensor 15 and the detected temperature of the outdoor-heat-exchanger-outlet temperature sensor 12 has become equal to or greater than the frost-forming temperature difference.

Figure 4:
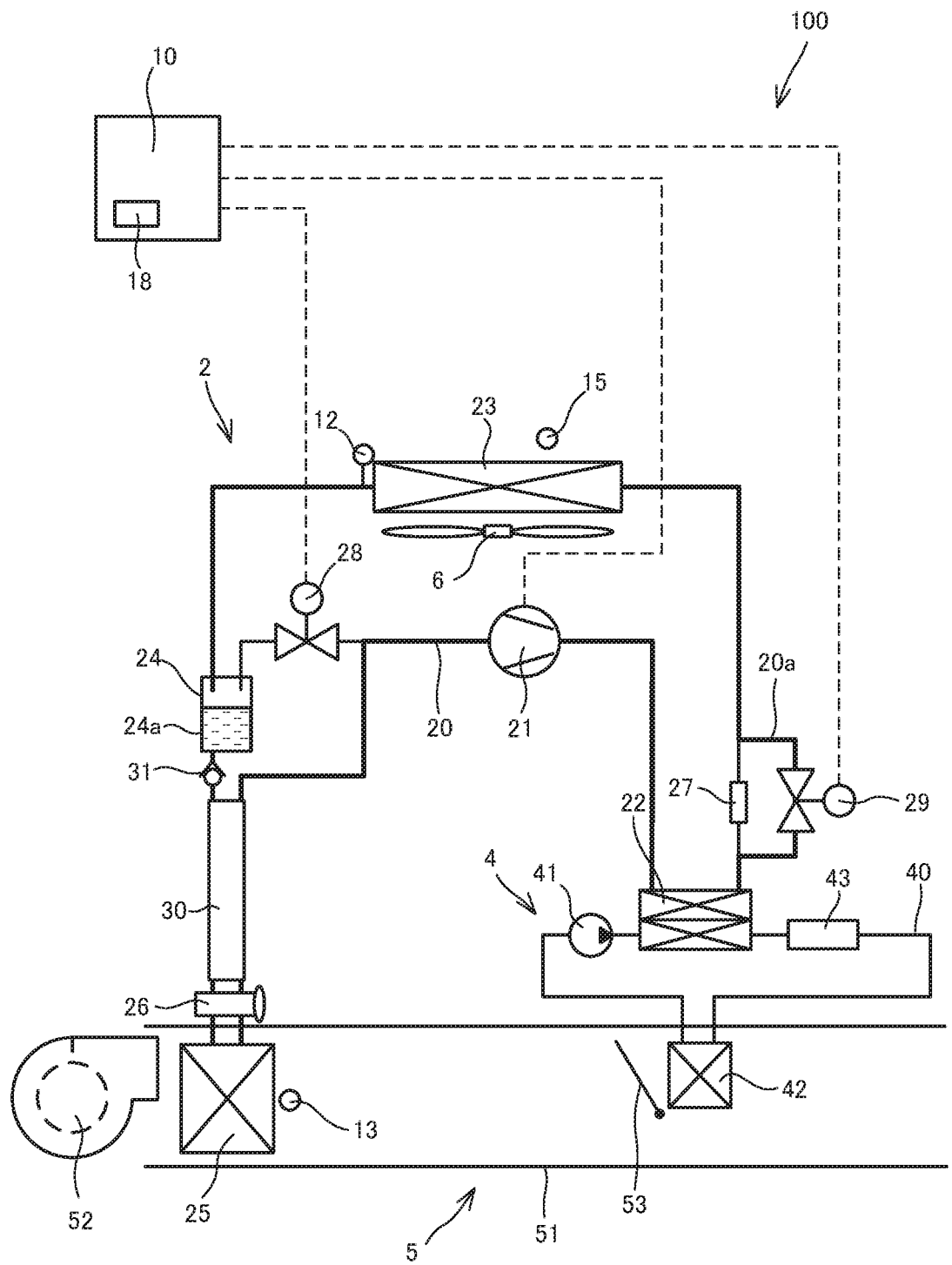
FIG. 4 is a diagram for explaining a flow of a refrigerant of the air-conditioning device at the time of a cabin-cooling operation.
Figure 5:
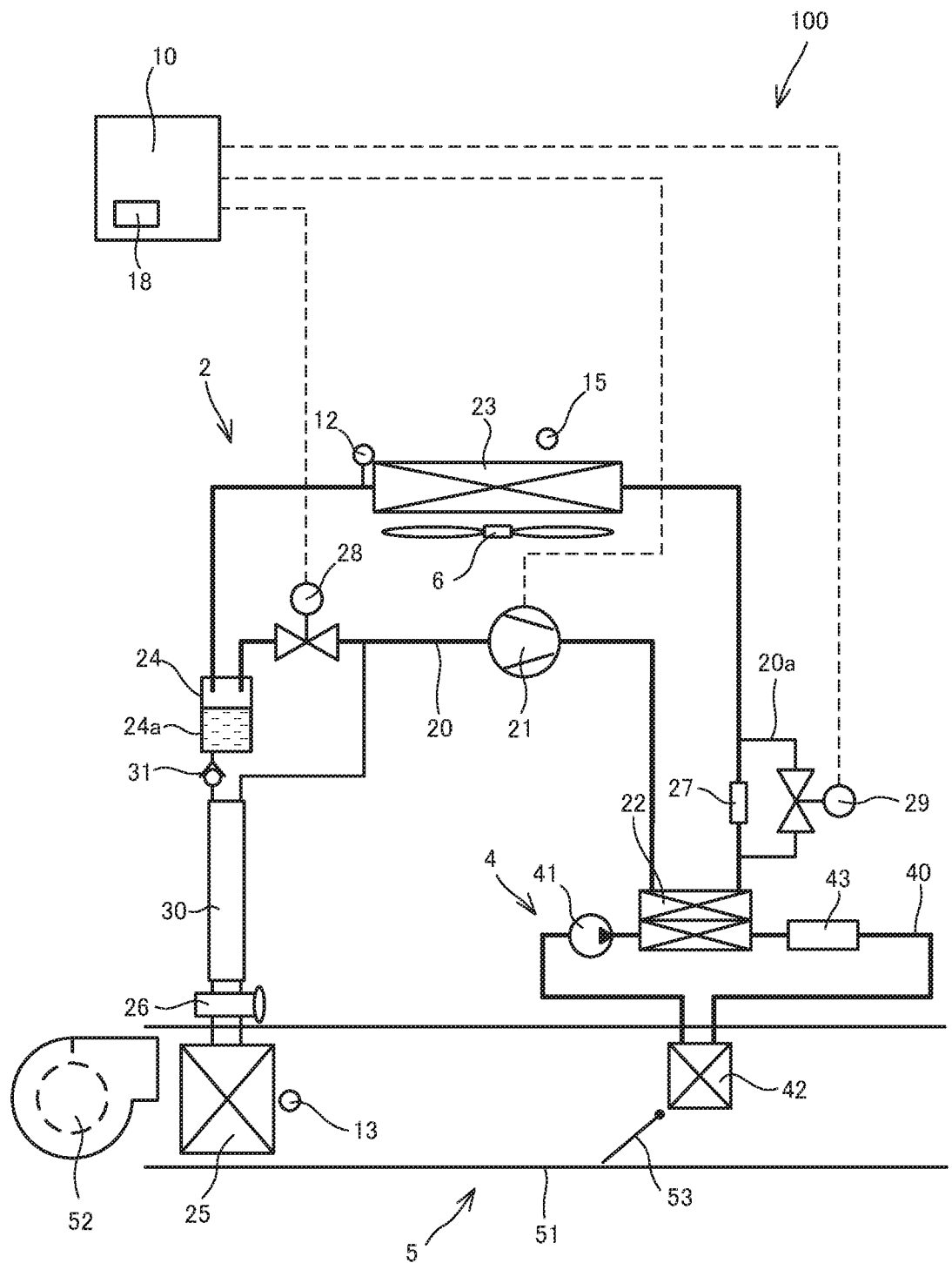
FIG. 5 is a diagram for explaining the flow of the refrigerant of the air-conditioning device in a heat pump cabin-heating mode at the time of a cabin-heating operation and a dehumidifying cabin-heating operation.
Figure 6:
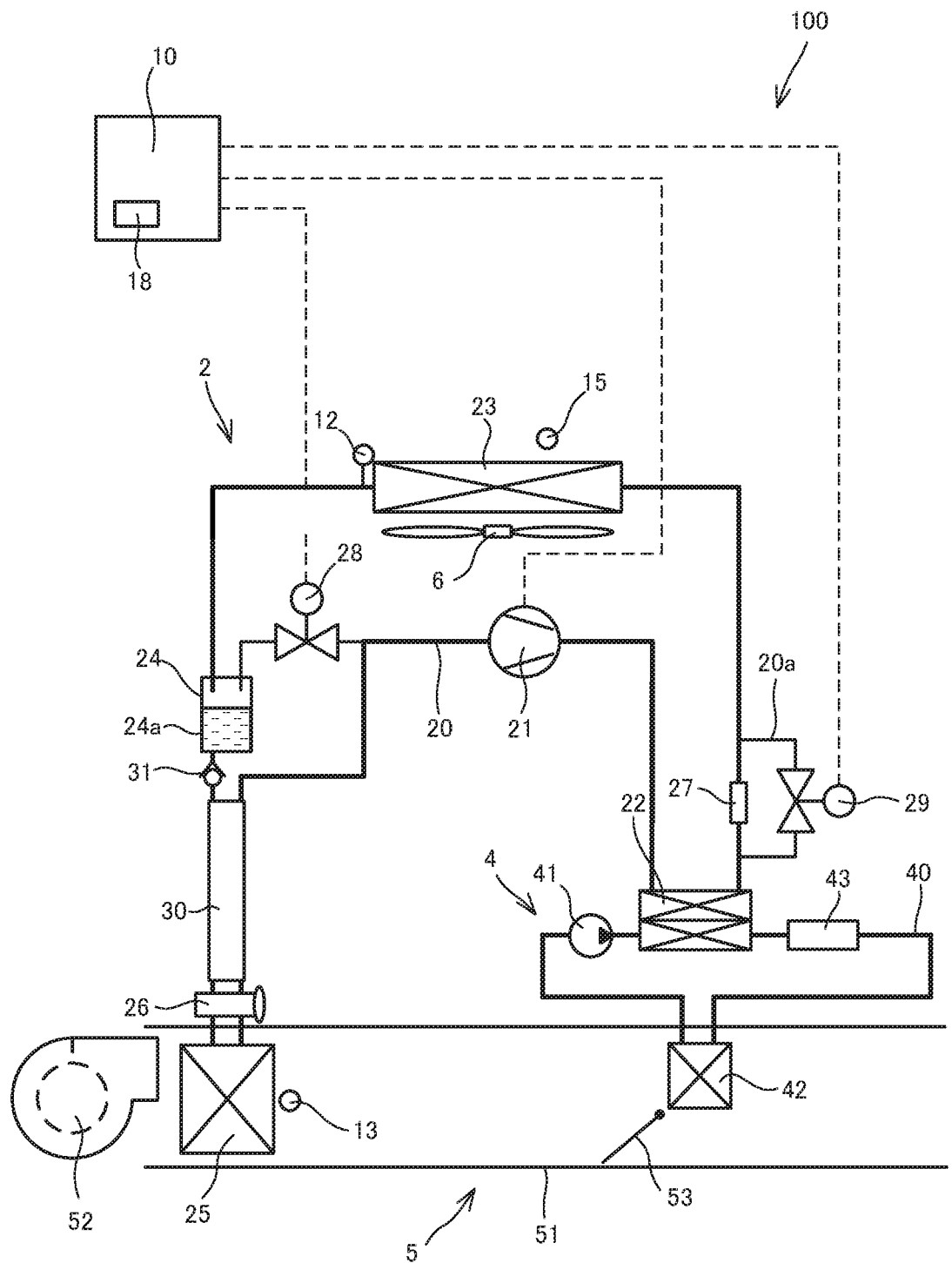
FIG. 6 is a diagram for explaining the flow of the refrigerant of the air-conditioning device in a dehumidifying cabin-heating mode at the time of the dehumidifying cabin-heating operation.

Next, respective air-conditioning operation modes of the air-conditioning device 100 will be described with reference to FIGS. 4 to 6.

Cabin-Cooling Operation

At the time of the cabin-cooling operation, an operation mode of the refrigeration cycle 2 is switched to the cabin-cooling mode. In the cabin-cooling mode, the refrigerant in the refrigeration cycle 2 circulates as shown by thick solid lines in FIG. 4.

The controller 10 closes the first flow-path switching valve 28 and opens the second flow-path switching valve 29.

The refrigerant that has become high temperature and high pressure by being compressed in the compressor 21 flows to the outdoor heat exchanger 23 through the fluid-cooled condenser 22 and the second flow-path switching valve 29. At this time, because the hot water in the hot-water cycle 4 is not circulated, almost no heat exchange is performed in the fluid-cooled condenser 22. In addition, the refrigerant bypasses the fixed restrictor 27 and passes through the bypass channel 20*a*. In a case in which the solenoid restrictor valve 127 (see FIG. 2) is provided instead of the fixed restrictor 27, the solenoid restrictor valve 127 is adjusted so as not to restrict the flow of the refrigerant.

The refrigerant that has reached the outdoor heat exchanger 23 is cooled through the heat exchange with the outside air introduced to the outdoor heat exchanger 23, and thereafter, the refrigerant is subjected to the gas/liquid separation in the liquid receiver 24. With such a configuration, the liquid-state refrigerant is stored in the liquid receiver 24. A part of the liquid-state refrigerant from the liquid receiver 24 flows via the internal heat exchanger 30 into the thermostatic expansion valve 26 connected on the downstream side of the liquid receiver 24.

Thereafter, the liquid-state refrigerant is decompressed and expanded by the thermostatic expansion valve 26 and flows into the evaporator 25. While passing through the evaporator 25, the liquid-state refrigerant is evaporated by absorbing the heat of the air to be used for the air-conditioning. The gaseous-state refrigerant that has been obtained by the evaporation in the evaporator 25 passes through the internal heat exchanger 30 and flows again into the compressor 21.

In other words, in the cabin-cooling mode, the high-pressure refrigerant discharged from the compressor 21 passes through the fluid-cooled condenser 22, the high-pressure refrigerant that has passed through the fluid-cooled condenser 22 flows into the outdoor heat exchanger 23, the liquid receiver 24 stores the liquid-state refrigerant obtained by separating the refrigerant that has been lead out from the outdoor heat exchanger 23 into the gaseous-state refrigerant and the liquid-state refrigerant, the thermostatic expansion valve 26 causes the liquid-state refrigerant that has been lead out from the liquid receiver 24 to be decompressed and expanded, the evaporator 25 evaporates the refrigerant by performing the heat exchange between the low-pressure refrigerant that has been decompressed and expanded by the thermostatic expansion valve 26 and the air to be guided to the vehicle cabin, and the gaseous-state refrigerant is guided to the compressor 21.

The liquid-state refrigerant flowing from the liquid receiver 24 to the internal heat exchanger 30 is a high-pressure fluid and is in a substantially saturated liquid state at which a degree of supercooling is about 0° C. after being subjected to the gas/liquid separation in the liquid receiver 24. On the other hand, the gaseous-state refrigerant flowing from the evaporator 25 to the internal heat exchanger 30 has become a low-temperature fluid by being decompressed and expanded while flowing through the thermostatic expansion valve 26. Therefore, the liquid-state refrigerant is subjected to the heat exchange with the low-temperature gaseous-state refrigerant while flowing through the internal heat exchanger 30, and the liquid-state refrigerant reaches the supercooled state with the degree of supercooling from the saturated liquid state by being supercooled by the gaseous-state refrigerant. In addition, the gaseous-state refrigerant reaches a heated state with the degree of superheating by being heated by the liquid-state refrigerant while flowing through the internal heat exchanger 30.

The air that has been cooled with the refrigerant in the evaporator 25 is used as cabin cooling wind by flowing towards the downstream side of the HVAC unit 5.

Cabin-Heating Operation

At the time of the cabin-heating operation, the operation mode of the refrigeration cycle 2 is switched to a heat pump cabin-heating mode. At the time of the cabin-heating operation, so called outside-air heat-absorbing heat pump operation is performed. In the heat pump cabin-heating mode, the refrigerant in the refrigeration cycle 2 and the hot water in the hot-water cycle 4 circulate as shown by the thick solid lines in FIG. 5.

The controller 10 opens the first flow-path switching valve 28 and closes the second flow-path switching valve 29.

The refrigerant that has become high temperature by being compressed in the compressor 21 flows to the fluid-cooled condenser 22. The refrigerant that has reached the fluid-cooled condenser 22 heats the hot water within the fluid-cooled condenser 22, becomes low temperature by being decompressed and expanded by flowing through the fixed restrictor 27, and flows to the outdoor heat exchanger 23.

The refrigerant that has reached the outdoor heat exchanger 23 is subjected to the heat exchange with the outside air introduced to the outdoor heat exchanger 23, and thereafter, the refrigerant flows to the liquid receiver 24 and is subjected to the gas/liquid separation. Then, the gaseous-state refrigerant obtained from the refrigerant subjected to the gas/liquid separation in the liquid receiver 24 flows again to the compressor 21 through the first flow-path switching valve 28. As described above, in the heat pump cabin-heating mode, the liquid-state refrigerant is stored in the liquid receiver 24, and the gaseous-state refrigerant is guided to the compressor 21.

In other words, in the heat pump cabin-heating mode, the fluid-cooled condenser 22 performs the heat exchange between the high-pressure refrigerant that has been discharged from the compressor 21 and the air to be guided to the vehicle cabin via the hot-water cycle 4, the refrigerant that has been lead out from the fluid-cooled condenser 22 is decompressed and expanded by the fixed restrictor 27, the refrigerant that has been decompressed and expanded by the fixed restrictor 27 flows into the outdoor heat exchanger 23, the liquid receiver 24 separates the low-pressure refrigerant that has been lead out from the outdoor heat exchanger 23 into the gaseous-state refrigerant and the liquid-state refrigerant, and the gaseous-state refrigerant is guided to the compressor 21.

On the other hand, the hot water that has been heated with the refrigerant in the fluid-cooled condenser 22 circulates and flows into the heater core 42, thereby heating the surrounding air of the heater core 42. Thus-heated air flows towards the downstream side of the HVAC unit 5 and is used as a cabin-heating wind.

Note that, in the case in which the hot water cannot be heated sufficiently with the refrigerant in the fluid-cooled condenser 22, the hot water may be heated by operating the hot water heater 43 alone or in combination with the outside-air heat-absorbing heat pump operation.

Dehumidifying Cabin-Heating Operation

At the time of a dehumidifying cabin-heating operation, the operation mode of the refrigeration cycle 2 is switched alternately between the heat pump cabin-heating mode serving as a first operation mode and the dehumidifying cabin-heating mode serving as a second operation mode. The Time at which the cabin-heating operation and the dehumidifying cabin-heating operation are performed corresponds to the operation state in which the flow of the refrigerant is restricted by the fixed restrictor 27 and the heat is released in the heater core 42. Because the heat pump cabin-heating mode is similar to that of the cabin-heating operation, a detail description thereof is omitted. In the dehumidifying cabin-heating mode, the refrigerant in the refrigeration cycle 2 and the hot water in the hot-water cycle 4 circulate as shown by the thick solid lines in FIG. 6.

The controller 10 closes the first flow-path switching valve 28 and closes the second flow-path switching valve 29.

The refrigerant that has become high temperature by being compressed in the compressor 21 flows to the fluid-cooled condenser 22. The refrigerant that has reached the fluid-cooled condenser 22 heats the hot water within the fluid-cooled condenser 22, becomes low temperature by being decompressed and expanded by passing through the fixed restrictor 27, and flows to the outdoor heat exchanger 23. In a case in which the solenoid restrictor valve 127 (see FIG. 2) is provided instead of the fixed restrictor 27, the solenoid restrictor valve 127 is adjusted so as to restrict the flow of the refrigerant.

The refrigerant that has reached the outdoor heat exchanger 23 is subjected to the heat exchange with the outside air introduced to the outdoor heat exchanger 23, and thereafter, the refrigerant is subjected to the gas/liquid separation in the liquid receiver 24. Then, the liquid-state refrigerant stored in the liquid receiver 24 in the heat pump cabin-heating mode and the liquid-state refrigerant subjected to the gas/liquid separation in the liquid receiver 24 flows via the internal heat exchanger 30. As described above, in the dehumidifying cabin-heating mode, the liquid-state refrigerant stored in the liquid receiver 24 is guided to the evaporator 25.

Thereafter, the liquid-state refrigerant is decompressed and expanded by the thermostatic expansion valve 26 and flows into the evaporator 25. While passing through the evaporator 25, the liquid-state refrigerant is evaporated by absorbing the heat of the air to be used for the air-conditioning. The gaseous-state refrigerant that has been obtained by the evaporation in the evaporator 25 passes through the internal heat exchanger 30 and flows again into the compressor 21.

In other words, in the dehumidifying cabin-heating mode, the fluid-cooled condenser 22 performs the heat exchange between the high-pressure refrigerant that has been discharged from the compressor 21 and the air to be guided to the vehicle cabin, the refrigerant that has been lead out from the fluid-cooled condenser 22 is decompressed and expanded by the fixed restrictor 27, the intermediate-pressure refrigerant that has been decompressed and expanded by the fixed restrictor 27 flows into the outdoor heat exchanger 23, the liquid receiver 24 separates the refrigerant that has been lead out from the outdoor heat exchanger 23 into the gaseous-state refrigerant and the liquid-state refrigerant, the thermostatic expansion valve 26 causes the liquid-state refrigerant that has been lead out from the liquid receiver 24 to be decompressed and expanded, the evaporator 25 evaporates the refrigerant by performing the heat exchange between the low-pressure refrigerant that has been decompressed and expanded by the thermostatic expansion valve 26 and the air to be guided to the vehicle cabin, and the gaseous-state refrigerant is guided to the compressor 21.

The air flows towards the downstream side of the HVAC unit 5 is used as the dehumidifying cabin-heating wind by being dehumidified by the evaporator 25 and being heated by the heater core 42.

Note that, in the case in which the hot water cannot be heated sufficiently with the refrigerant in the fluid-cooled condenser 22, the hot water may be heated by operating the hot water heater 43 alone or in combination with the outside-air heat-absorbing heat pump operation.

As described above, in the operation state in which the flow of the refrigerant is restricted by the fixed restrictor 27 and the heat is released in the heater core 42, the heat pump cabin-heating mode and the dehumidifying cabin-heating mode are switched with each other. In the heat pump cabin-heating mode, while performing the cabin-heating operation, the liquid-state refrigerant obtained from the refrigerant guided from the outdoor heat exchanger 23 is stored in the liquid receiver 24. In the dehumidifying cabin-heating mode, the liquid-state refrigerant stored in the liquid receiver 24 in the heat pump cabin-heating mode is guided to the evaporator 25. Thus, by switching the operation mode between the heat pump cabin-heating mode and the dehumidifying cabin-heating mode, it is possible to store the liquid-state refrigerant in the liquid receiver 24 and to perform the dehumidification by using thus-stored liquid-state refrigerant, while performing the cabin-heating operation. Therefore, it is possible to perform the dehumidifying cabin-heating operation in which the dehumidification is performed while maintaining the cabin-heating state.

Figure 7:
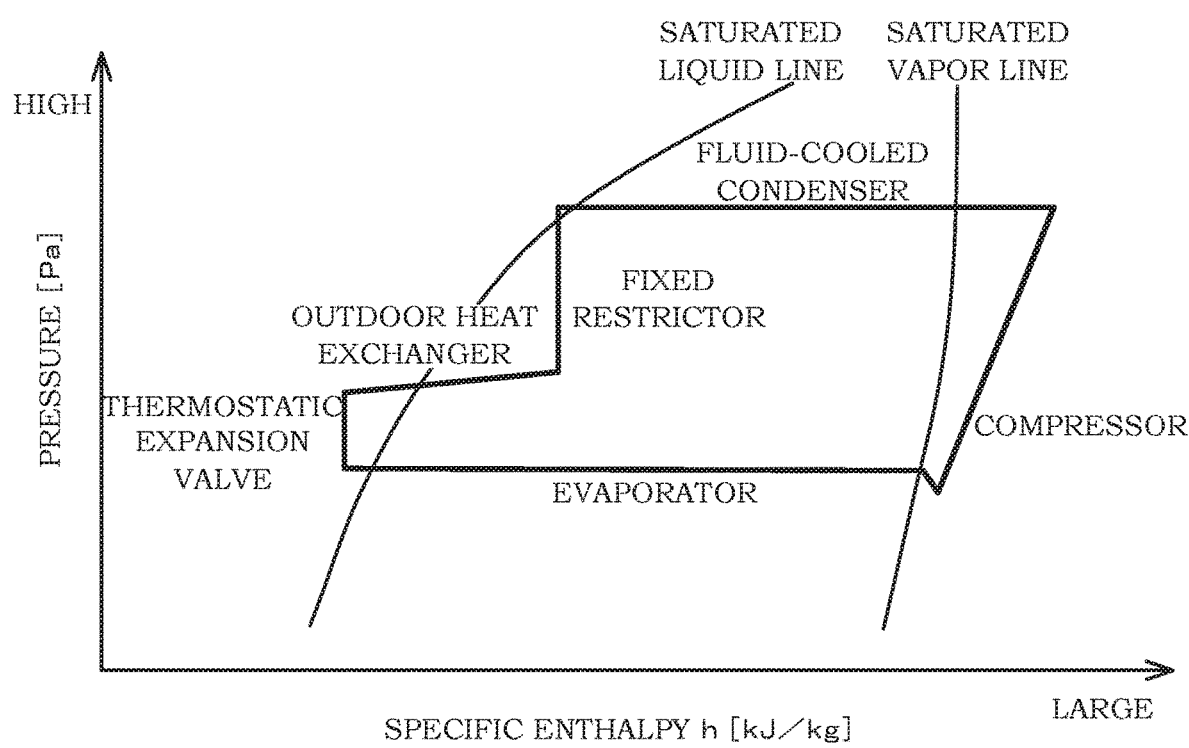
FIG. 7 is a Mollier diagram for explaining the dehumidifying cabin-heating mode at the time of the dehumidifying cabin-heating operations.

In addition, in the dehumidifying cabin-heating mode, the first flow-path switching valve 28 is switched such that the refrigerant passes through the thermostatic expansion valve 26, and the second flow-path switching valve 29 is switched such that the refrigerant passes through the fixed restrictor 27. As shown in FIG. 7, in the dehumidifying cabin-heating mode, the refrigerant that has been compressed in the compressor 21 is subjected to the heat exchange in the fluid-cooled condenser 22, and thereafter, the pressure of the refrigerant is reduced as it passes through the fixed restrictor 27. The refrigerant is then subjected to the heat exchange in the outdoor heat exchanger 23, and thereafter, the pressure of the refrigerant is further reduced by the thermostatic expansion valve 26. In other words, because the flow of the refrigerant is restricted by the fixed restrictor 27, the pressure of the refrigerant in the outdoor heat exchanger 23 is lower than the pressure of the refrigerant in the fluid-cooled condenser 22 in both of the heat pump cabin-heating mode and the dehumidifying cabin-heating mode.

Thus, in a case in which the operation mode is switched between the heat pump cabin-heating mode and the dehumidifying cabin-heating mode, the first flow-path switching valve 28 is opened/closed in a state in which the pressure of the refrigerant has been reduced to some extent by passing through the fixed restrictor 27. In other words, because, when the first flow-path switching valve 28 is opened/closed, the pressure difference between the upstream side and the downstream side of the first flow-path switching valve 28 is small, a pressure fluctuation range and a temperature fluctuation range are small as compared with those in a case in which the operation mode is switched between the heat pump cabin-heating mode and the cabin-cooling mode. Thus, generation of noise caused by switching the paths of the refrigerant in the refrigeration cycle 2 is suppressed.

Furthermore, the air-conditioning device 100 is provided with the liquid receiver 24 that guides the gaseous-state refrigerant that has entered from the outdoor heat exchanger 23 to the compressor 21 at the time of the cabin-heating operation and that guides the liquid-state refrigerant that has entered from the outdoor heat exchanger 23 to the expansion valve at the time of the cabin-cooling operation. Therefore, when the flow of the refrigerant in the refrigeration cycle 2 is switched by opening/closing the first flow-path switching valve 28 in order to switch the heat pump cabin-heating mode to the dehumidifying cabin-heating mode, the liquid-state refrigerant is guided from the liquid receiver 24 to the thermostatic expansion valve 26, and therefore, the noise is less likely to be generated.

As described above, when the dehumidifying cabin-heating operation is performed, it is possible to suppress the generation of noise caused by switching the paths of the refrigerant in the refrigeration cycle 2.

Note that, the first flow-path switching valve 28 may not be fully closed when the valve is closed, and it may be configured such that a small flow of the refrigerant is allowed. Because a fluctuation of the flow rate of the refrigerant at the time of opening/closing the first flow-path switching valve 28 is suppressed with this small flow of the refrigerant, the noise is less likely to be generated.

Figure 8:
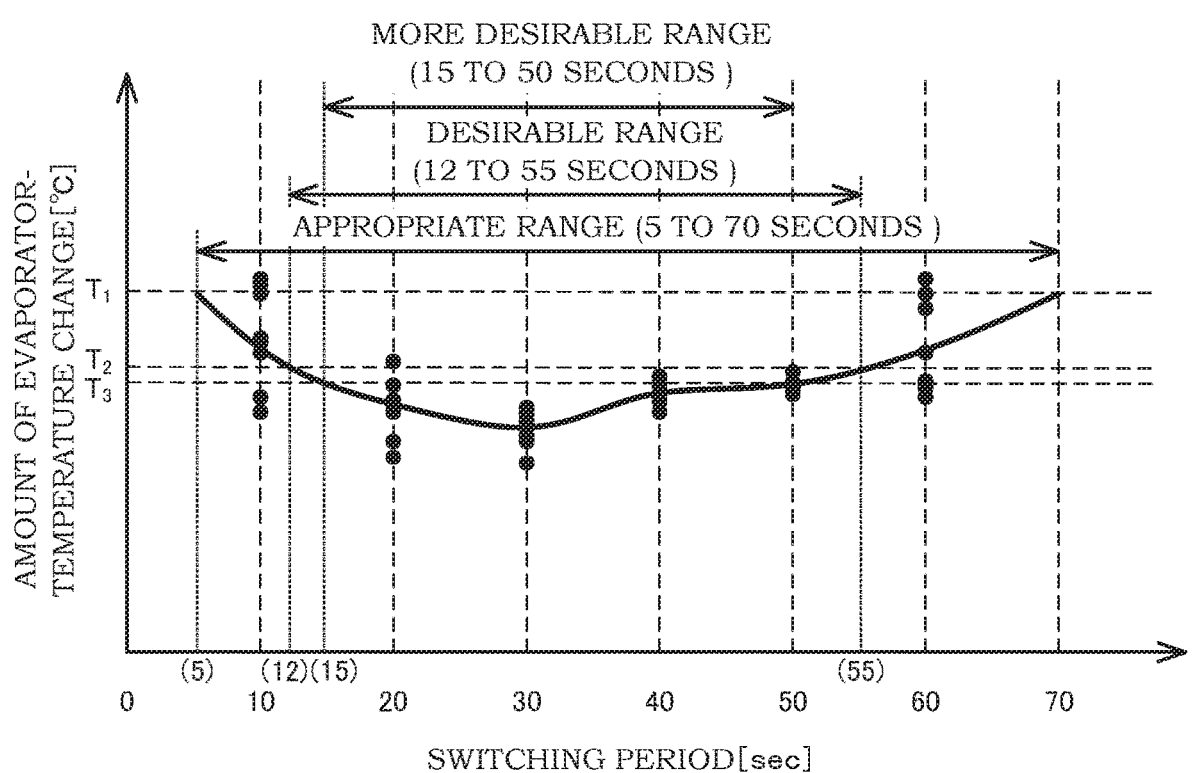
FIG. 8 is a diagram for explaining amounts of change in temperature of an evaporating unit with respect to a switching period for the heat pump cabin-heating mode and the dehumidifying cabin-heating mode.

In addition, the heat pump cabin-heating mode and the dehumidifying cabin-heating mode are switched alternately at the period of from 5 seconds to 70 seconds. FIG. 8 shows results from measurements of the amount of change in the temperature at a plurality of points (for example, twenty points in four rows*five columns) on a surface of the evaporator 25 that is perpendicular to the flow direction of the air flowing in the HVAC unit 5 in a case in which the heat pump cabin-heating mode and the dehumidifying cabin-heating mode are alternately switched. The plots shown in FIG. 8 show the amounts of change in the temperature measured under different test condition, and a curve in FIG. 8 shows the average values for the respective measurements. An appropriate range for the amount of change in the temperature of the air that has passed along the evaporator 25 is equal to or lower than $T_1$ [° C.].

As shown in FIG. 8, in a case in which a switching period is between 5 and 70 seconds, the amount of change in the temperature of the evaporator 25 falls within the appropriate range. In a case in which the switching period is shorter than 5 seconds, after the mode has been switched to the dehumidifying cabin-heating mode, the mode is switched again to the heat pump cabin-heating mode at the timing at which before the evaporator 25 is sufficiently cooled. On the other hand, in a case in which the switching period is longer than 70 seconds, there is a risk in that the evaporator 25 is cooled to an excessive extent such that a part thereof becomes frozen after the mode has been switched to the dehumidifying cabin-heating mode.

Figure 9:
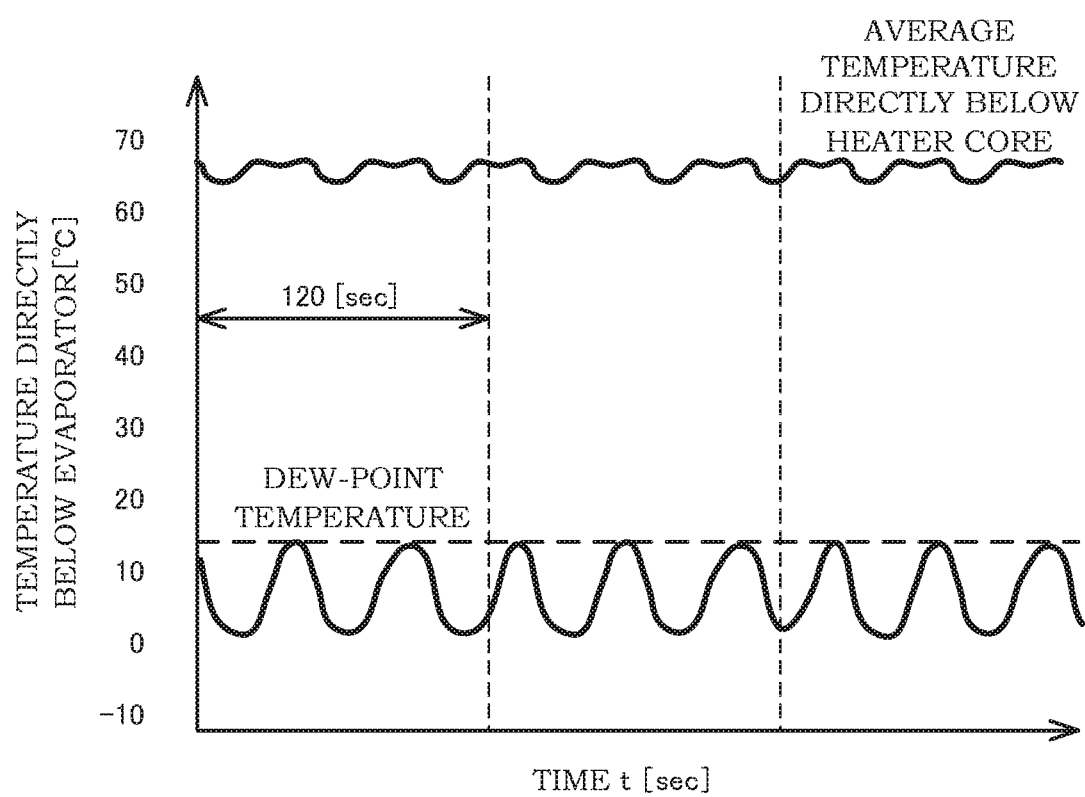
FIG. 9 is a diagram for showing temperature directly below the evaporating unit in a case in which the heat pump cabin-heating mode and the dehumidifying cabin-heating mode are alternately switched at an appropriate switching period.

As shown in FIG. 9, in a case in which the switching period is set to the appropriate switching period of from 5 to 70 seconds, the heat pump cabin-heating mode and the dehumidifying cabin-heating mode are switched alternately such that the temperature of the air that has passed along the evaporator 25 varies within a pre-set appropriate range of the amount of change in the temperature.

Thus, in a case in which the heat pump cabin-heating mode and the dehumidifying cabin-heating mode are switched alternately at the period of from 5 seconds to 70 seconds, the temperature of the air that has passed along the evaporator 25 varies within the pre-set appropriate range, and therefore, it is possible to allow the dehumidification performance to be exhibited sufficiently while avoiding the freezing of the evaporator 25. In addition, at this time, as shown in FIG. 9, because the average temperature of the air that has passed along the heater core 42 is also maintained within the appropriate temperature range, the cabin-heating performance is prevented from being lowered. Therefore, by alternately switching the heat pump cabin-heating mode and the dehumidifying cabin-heating mode at the period of from 5 seconds to 70 seconds, it is possible to perform the dehumidifying cabin-heating operation.

Note that, if the compressor 21 is stopped when the heat pump cabin-heating mode and the dehumidifying cabin-heating mode are switched by opening/closing the first flow-path switching valve 28, a difference between high and low pressures becomes large when the compressor 21 is started after the switching, and so, a starting torque of the compressor 21 is increased. Therefore, it is desirable that the compressor 21 is not stopped when the first flow-path switching valve 28 is opened/closed.

In addition, desirably, the heat pump cabin-heating mode and the dehumidifying cabin-heating mode are switched alternately at the period of from 12 seconds to 55 seconds. A desirable range for the amount of change in the temperature of the air that has passed along the evaporator 25 is equal to or lower than $T_2$ [° C.] that is lower than $T_1$. As shown in FIG. 8, in a case in which the switching period is between 12 and 55 seconds, the amount of change in the temperature of the evaporator 25 falls within the desirable range.

In this case, as compared with the case in which the heat pump cabin-heating mode and the dehumidifying cabin-heating mode are switched alternately at the period of from 5 seconds to 70 seconds, the operation mode is further prevented from being switched again to the heat pump cabin-heating mode at the timing at which before the evaporator 25 is sufficiently cooled after the mode has been switched to the dehumidifying cabin-heating mode. In addition, the evaporator 25 is further prevented from being cooled to an excessive extent such that a part thereof becomes frozen after the mode has been switched to the dehumidifying cabin-heating mode.

More desirably, the heat pump cabin-heating mode and the dehumidifying cabin-heating mode are switched alternately at the period of from 15 seconds to 50 seconds. A more desirable range for the amount of change in the temperature of the air that has passed along the evaporator 25 is equal to or lower than $T_3$ [° C.] that is further lower than $T_2$. As shown in FIG. 8, in a case in which the switching period is between 15 and 50 seconds, the amount of change in temperature of the evaporator 25 falls within the more desirable range.

In this case, as compared with the case in which the heat pump cabin-heating mode and the dehumidifying cabin-heating mode are switched alternately at the period of from 12 seconds to 55 seconds, the operation mode is further prevented from being switched again to the heat pump cabin-heating mode at the timing at which before the evaporator 25 is sufficiently cooled after the mode has been switched to the dehumidifying cabin-heating mode. In addition, the evaporator 25 is further prevented from being cooled to an excessive extent such that a part thereof becomes frozen after the mode has been switched to the dehumidifying cabin-heating mode.

Note that, in a case in which the dehumidifying cabin-heating operation is performed when the air-conditioning device 100 is started, the operation mode of the refrigeration cycle 2 is first switched to the heat pump cabin-heating mode. For example, when the air-conditioning device 100 is started at the time of cold-start, the liquid-state refrigerant may not be stored sufficiently in the liquid receiver 24. Therefore, by first operating the refrigeration cycle 2 in the heat pump cabin-heating mode, it is possible to allow the liquid-state refrigerant to be stored in the liquid receiver 24.

Next, a modification of switching between the heat pump cabin-heating mode and the dehumidifying cabin-heating mode at the time of the dehumidifying cabin-heating operation will be described with reference to FIGS. 10 to 12. In this modification, the operation mode of the refrigeration cycle 2 is switched on the basis of the temperature of the evaporator 25 (the temperature of the air that has passed along the evaporator 25) $T_E$.

Figure 10:
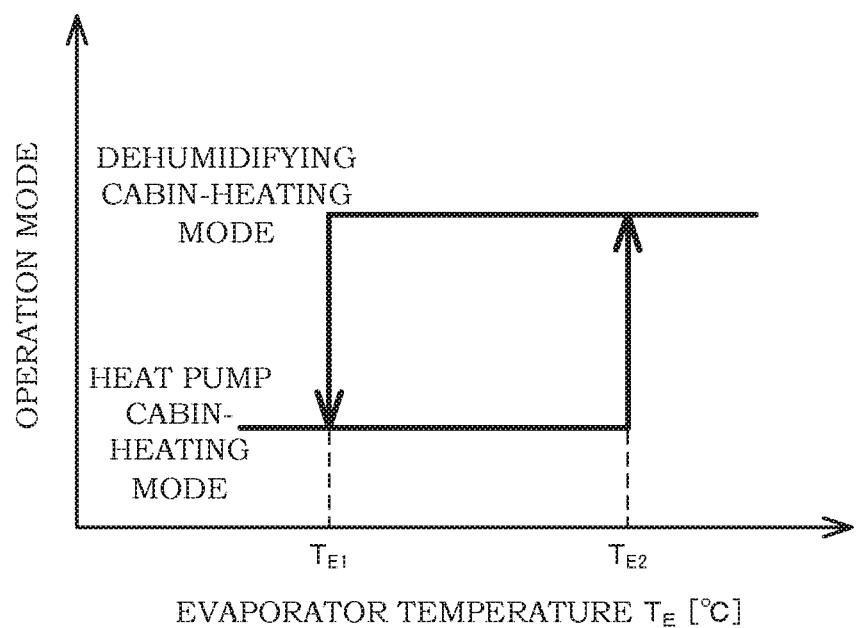
FIG. 10 is a conceptual diagram for explaining a modification of switching between the heat pump cabin-heating mode and the dehumidifying cabin-heating mode.

In FIG. 10, the horizontal axis is taken as the temperature $T_E$ [° C.] of the evaporator 25, and the vertical axis is taken as the operation mode of the refrigeration cycle 2.

As shown in FIG. 10, the controller 10 switches the operation mode of the refrigeration cycle 2 to the heat pump cabin-heating mode when the temperature $T_E$ of the evaporator 25 becomes equal to or lower than a first set temperature $T_{E1}$ [° C.] in a state in which the refrigeration cycle 2 is operated in the dehumidifying cabin-heating mode. On the other hand, the controller 10 switches the operation mode of the refrigeration cycle 2 to the dehumidifying cabin-heating mode when the temperature $T_E$ of the evaporator 25 becomes equal to or higher than a second set temperature $T_{E2}$ [° C.] in a state in which the refrigeration cycle 2 is in the heat pump cabin-heating mode.

In the above, the first set temperature $T_{E1}$ and the second set temperature $T_{E2}$ are values that are set in advance. The second set temperature $T_{E2}$ is set so as to be higher than the first set temperature $T_{E1}$. For example, the first set temperature $T_{E1}$ is set at 1° C., and the second set temperature $T_{E2}$ is set at 4° C.

By doing so, the temperature of the evaporator 25 varies between the first set temperature $T_{E1}$ and the second set temperature $T_{E2}$, and therefore, it is possible to allow the dehumidification performance to be exhibited sufficiently while avoiding the freezing of the evaporator 25. Therefore, by alternately switching the heat pump cabin-heating mode and the dehumidifying cabin-heating mode such that the temperature $T_E$ of the evaporator 25 varies between the first set temperature $T_{E1}$ and the second set temperature $T_{E2}$, it is possible to perform the dehumidifying cabin-heating operation.

Figure 11:
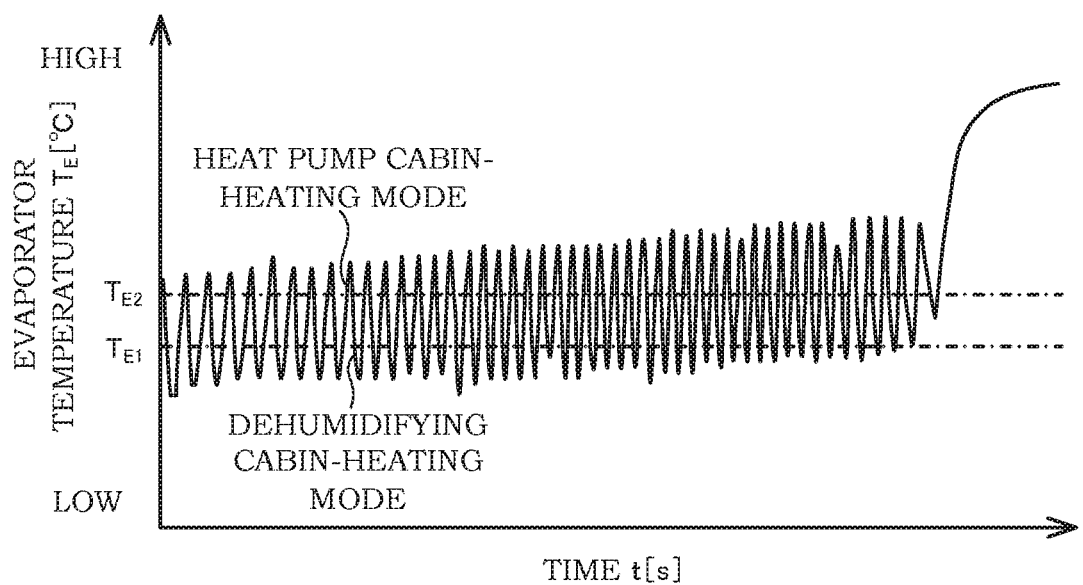
FIG. 11 is a graph for explaining a change in the temperature of the evaporating unit.

In FIG. 11, the horizontal axis is taken as time t [seconds], and the vertical axis is taken as the temperature $T_E$ of the evaporator 25.

As shown in FIG. 11, in a case which the refrigeration cycle 2 is in the dehumidifying cabin-heating mode, the temperature $T_E$ of the evaporator 25 is lowered by the refrigerant passing through the evaporator 25. On the other hand, in a case in which the refrigeration cycle 2 is in the heat pump cabin-heating mode, the temperature $T_E$ of the evaporator 25 is increased by the heat of the air that is subjected to the heat exchange in the evaporator 25.

In other words, by alternately switching the heat pump cabin-heating mode and the dehumidifying cabin-heating mode, the temperature $T_E$ of the evaporator 25 varies so as to be increased and decreased repeatedly and periodically.

However, in a case in which the refrigeration cycle 2 is in the dehumidifying cabin-heating mode, if the amount of the refrigerant passing through the evaporator 25 is insufficient, there is a risk in that the temperature of the evaporator 25 is increased gradually, and the temperature cannot be lowered to the temperature equal to or lower than the first set temperature $T_{E1}$. In this case, the operation mode of the refrigeration cycle 2 is maintained in the dehumidifying cabin-heating mode without being switched.

Figure 12:
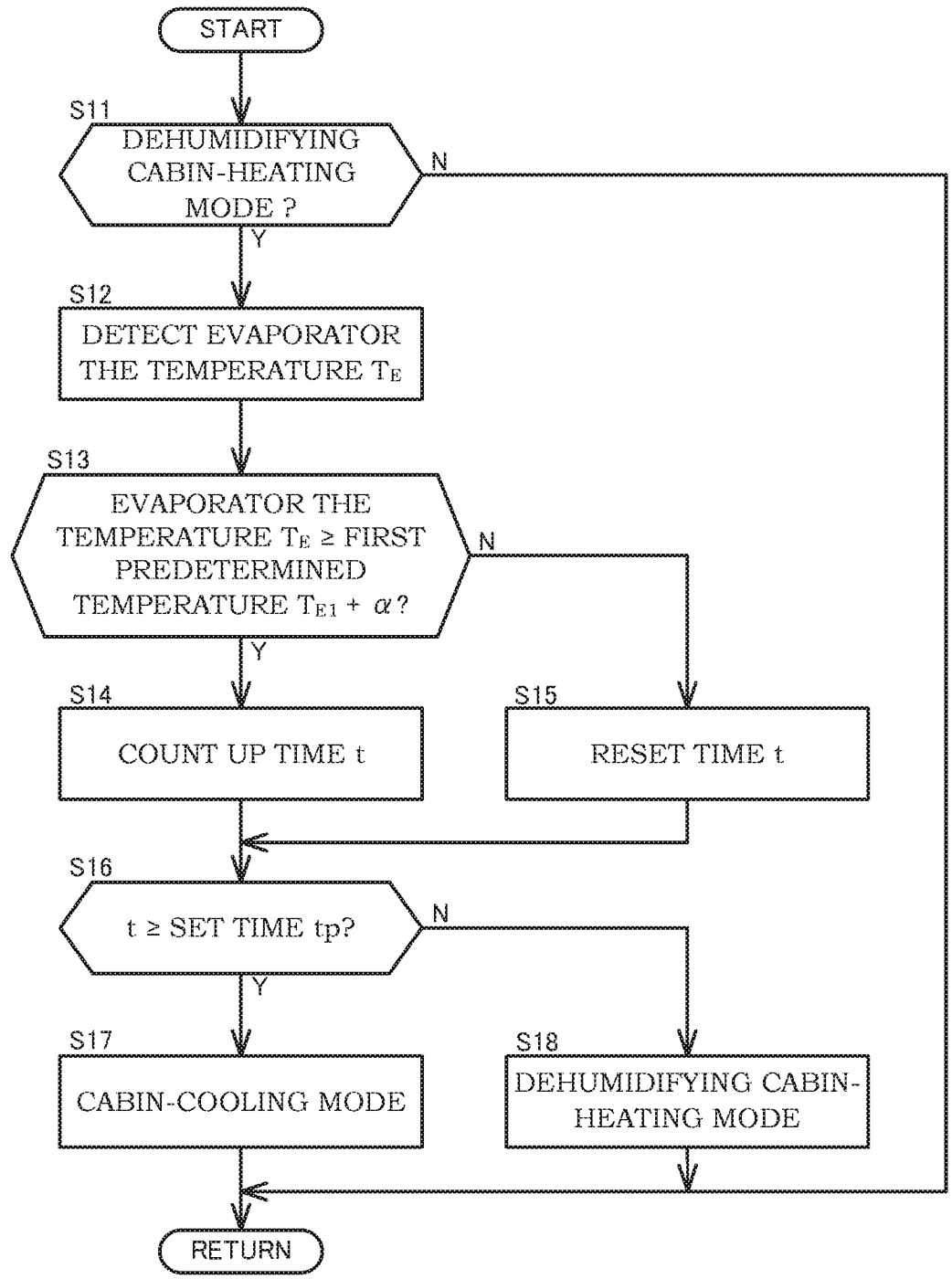
FIG. 12 is a flowchart for explaining temporal switching from the dehumidifying cabin-heating mode to a cabin-cooling mode at the time of the dehumidifying cabin-heating operation.

Thus, the controller 10 performs a control shown in FIG. 12 in order to reduce the temperature of the evaporator 25. The controller 10 repeatedly executes the routine process shown in FIG. 12 at fixed time intervals, for example, at every 10 milliseconds.

In Step S11, the controller 10 determines whether or not the operation mode of the refrigeration cycle 2 is in the dehumidifying cabin-heating mode. In Step S11, when it is determined that the operation mode is in the dehumidifying cabin-heating mode, the process proceeds to Step S12. On the other hand, in Step S11, when it is determined that the operation mode is not in the dehumidifying cabin-heating mode, the process proceeds to RETURN directly so as to exit the whole process.

In Step S12, the controller 10 detects the temperature $T_E$ of the evaporator 25 on the basis of the signals input by the evaporator temperature sensor 13.

In Step S13, the controller 10 determines whether or not the temperature $T_E$ of the evaporator 25 detected in Step S12 is equal to or higher than the first set temperature $T_{E1}+\alpha$ [° C.]. In other words, in Step S13, the controller 10 determines whether or not the temperature $T_E$ of the evaporator 25 differs from the first set temperature $T_{E1}$, which is the target value, by a value $\alpha$. $\alpha$ is set at, for example, 2° C. in advance.

In Step S13, when it is determined that the temperature $T_E$ of the evaporator 25 is equal to or higher than the first set temperature $T_{E1}+\alpha$, the process proceeds to Step S14 so as to count up the time t. On the other hand, in Step S13, when it is determined that the temperature $T_E$ of the evaporator 25 is not equal to or higher than the first set temperature $T_{E1}+\alpha$, in other words, when it is determined that the temperature $T_E$ of the evaporator 25 is lower than the first set temperature $T_{E1}+\alpha$, the process proceeds to Step S15 so as to reset the time t.

In Step S16, the controller 10 determines whether or not the time t is equal to or longer than a set time $t_p$. The set time $t_p$ is set at, for example, 60 seconds in advance. In Step S16, when it is determined that the time t is equal to or longer than the set time $t_p$, the process proceeds to Step S17. On the other hand, in Step S16, when it is determined that the time t is not equal to or longer than the set time $t_p$, in other words, when it is determined that the time t has not past the set time $t_p$, the process proceeds to Step S18.

In Step S17, because the liquid-state refrigerant is not flowing sufficiently from the liquid receiver 24 to the evaporator 25, in order to store the liquid-state refrigerant in the liquid receiver 24, the controller 10 operates the refrigeration cycle 2 in the cabin-cooling mode serving as a third operation mode. At this time, if the temperature of the air to be guided to the vehicle cabin is low relative to the target temperature, the air that has been cooled by passing along the evaporator 25 is heated (reheated) by using the hot water that has been heated by the hot water heater 43.

As described above, in the air-conditioning device 100, if a state in which the temperature $T_E$ of the evaporator 25 does not fall below the first set temperature $T_{E1}$ is continued in the dehumidifying cabin-heating mode, the mode is temporarily switched to the cabin-cooling mode. Specifically, in the air-conditioning device 100, the mode is temporarily switched to the cabin-cooling mode when a time period during which a state in which the divergence between the temperature detected by the evaporator temperature sensor 13 and the first set temperature $T_{E1}$ is equal to or greater than a is continued becomes equal to or longer than the set time $t_p$ in the dehumidifying cabin-heating mode.

In addition, instead of a case in which the temperature $T_E$ of the evaporator 25 does not fall below the first set temperature $T_{E1}$, the dehumidifying cabin-heating mode may be switched temporarily to the cabin-cooling mode on the basis of a refrigerant pressure, which is a property used in place of the temperature.

Thus, even if the temperature $T_E$ of the evaporator 25 cannot be lowered to the temperature below the first set temperature $T_{E1}$ any more, it is possible to avoid a situation in which the operation mode of the refrigeration cycle 2 is held to the dehumidifying cabin-heating mode and becomes unable to be switched, and therefore, it is possible to allow the operation mode of the refrigeration cycle 2 to be shifted to a state capable of performing the dehumidification.

Thereafter, the controller 10 continues the operation in the cabin-cooling mode until the temperature $T_E$ of the evaporator 25 is lowered to the temperature that is sufficiently lower than the first set temperature $T_{E1}$. Thereafter, the controller 10 switches the operation mode of the refrigeration cycle 2 to the dehumidifying cabin-heating mode. By doing so, it is possible to perform the dehumidifying cabin-heating operation in which the heat pump cabin-heating mode and the dehumidifying cabin-heating mode are switched alternately.

Instead, the controller 10 may determine whether or not the temperature $T_E$ of the evaporator 25 is equal to or lower than the first set temperature $T_{E1}$-β, and in a case in which the temperature $T_E$ becomes lower than the first set temperature $T_{E1}$ by β [° C.] or more, the operation mode of the refrigeration cycle 2 may be switched to the dehumidifying cabin-heating mode.

Note that, in the air-conditioning device 100, when the operation mode of the refrigeration cycle 2 is switched from the heat pump cabin-heating mode to the cabin-cooling mode, the operation mode is not switched directly, but the operation mode is switched to the dehumidifying cabin-heating mode once, and then, switched to the cabin-cooling mode.

In the dehumidifying cabin-heating mode, because the refrigerant is flowing in the evaporator 25, when the dehumidifying cabin-heating mode is switched to the cabin-cooling mode, only the second flow-path switching valve 29 needs to be switched. At this time, the flow of the refrigerant in the evaporator 25 stays the same. In addition, in the dehumidifying cabin-heating mode, the pressure difference between the upstream side and the downstream side of the fixed restrictor 27 is small as compared with the pressure difference in the heat pump cabin-heating mode. Thus, when the operation mode is switched from the heat pump cabin-heating mode to the cabin-cooling mode, by switching the modes via the dehumidifying cabin-heating mode, it is possible to switch the operation mode of the refrigeration cycle 2 smoothly.

Next, frost removal of the outdoor heat exchanger 23 using the dehumidifying cabin-heating mode will be described with reference to FIG. 13.

In a case in which the cabin-heating operation is performed in the heat pump cabin-heating mode, the temperature of the outdoor heat exchanger 23 is lowered, and the frost formation may be caused on the surface thereof. In this case, the frost is generally removed by using so called a hot gas cycle in which the refrigerant that has been compressed in the compressor 21 is directly guided to the outdoor heat exchanger 23.

Especially, in a case of the vehicle, such as an EV (Electric Vehicle) and a PHEV (Plug-in Hybrid Electric Vehicle), that can be charged from an external power source, it is possible to perform the frost removal by using the hot gas cycle during the vehicle is connected to the external power source and being charged.

However, in a case of a HEV (Hybrid Electric Vehicle) that cannot be charged from the external power source, also because of its relatively long distance to empty, there is a risk in that the cabin-heating performance is lowered due to the frost formation caused on the outdoor heat exchanger 23 during travelling.

Figure 13:
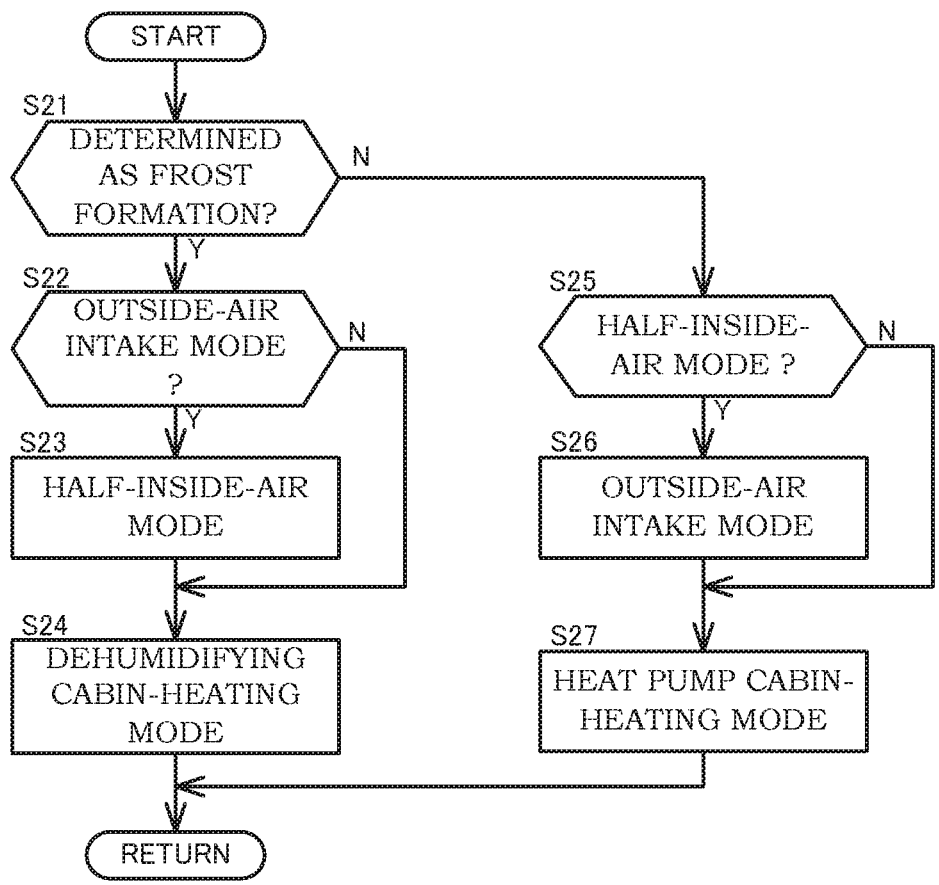
FIG. 13 is a flowchart for explaining switching between the heat pump cabin-heating mode and the dehumidifying cabin-heating mode in a case in which frost formation has been cause on the outdoor heat exchanger.

Thus, the controller 10 executes a control shown in FIG. 13 in order to remove the frost formed on the outdoor heat exchanger 23 during travelling. The controller 10 repeatedly executes the routine process shown in FIG. 13 at fixed time intervals, for example, at every 10 milliseconds.

In Step S21, the frost formation determination unit 18 compares the detected temperature of the outside temperature sensor 15 and the detected temperature of the outdoor-heat-exchanger-outlet temperature sensor 12, and determines that the temperature difference between the both has become equal to or greater than the frost-forming temperature difference with which the frost formation may be caused on the outdoor heat exchanger 23. The frost formation determination unit 18 determines that the frost formation has been caused on the outdoor heat exchanger 23 on the basis of the elapsed time of a state at which the temperature difference between the detected temperature of the outside temperature sensor 15 and the detected temperature of the outdoor-heat-exchanger-outlet temperature sensor 12 has become equal to or greater than the frost-forming temperature difference.

When it is determined that the frost formation has been caused on the outdoor heat exchanger 23 in Step S21, the process proceeds to Step S22. On the other hand, when it is determined that a state in which the frost formed on the outdoor heat exchanger 23 has been removed and no more frost removal is required is established in Step S21, the process proceeds to Step S25.

In Step S22, it is determined whether or not the HVAC unit 5 is in an outside-air intake mode in which the air outside the vehicle cabin is taken in and used for the air-conditioning.

When it is determined that the HVAC unit 5 is in the outside-air intake mode in Step S22, the process proceeds to Step S23. On the other hand, when it is determined that the HVAC unit 5 is not in the outside-air intake mode, in other words, that the HVAC unit 5 is in an inside-air circulation mode in which the air in the vehicle cabin is circulated, the process proceeds to Step S24.

In Step S23, the mode of the HVAC unit 5 is switched from the outside-air intake mode to the half-inside-air mode in which the air outside the vehicle cabin is used for the air-conditioning by being mixed with the air inside the vehicle cabin. In this case, the mode is switched such that a ratio between the air outside the vehicle cabin and the air inside the vehicle cabin becomes 1:1, in other words, such that 50% of the air to be guided into the vehicle cabin is the inside air circulation. If the outside-air intake mode is maintained, because the load of the evaporator 25 is low, low-pressure pressure is lowered to lower the temperature of the outdoor heat exchanger 23, and thereby, there is a risk in that the frost removal cannot be achieved. In contrast, in the half-inside-air mode, by increasing the load of the evaporator 25, it is possible to increase the temperature of the outdoor heat exchanger 23.

In Step S24, the operation is performed by switching the operation mode of the refrigeration cycle 2 to the dehumidifying cabin-heating mode. At this time, the switching to the dehumidifying cabin-heating mode is performed regardless of the above-described dehumidifying cabin-heating operation.

As described above, when the frost formation determination unit 18 determined that the frost formation has been caused on the outdoor heat exchanger 23, the operation mode of the refrigeration cycle 2 is switched from the heat pump cabin-heating mode to the dehumidifying cabin-heating mode. In addition, in a case in which the HVAC unit 5 is in the outside-air intake mode in which the air outside the vehicle cabin is taken in and used for the air-conditioning, the mode of the HVAC unit 5 is switched to the half-inside-air mode in which the air outside the vehicle cabin is used for the air-conditioning by being mixed with the air inside the vehicle cabin. As described above, by operating the refrigeration cycle 2 in the dehumidifying cabin-heating mode in a state in which the mode of the HVAC unit 5 has been switched to the half-inside-air mode, it is possible to remove the frost formed on the outdoor heat exchanger 23.

In addition, even when the mode is switched from the outside-air intake mode to the half-inside-air mode, a passenger in the vehicle cabin will not feel great uncomfortableness. Thus, it is possible to remove the frost formed on the outdoor heat exchanger 23 without causing the passenger to notice that the frost removal operation is performed.

In Steps S25 to S27, because it is determined that a state in which the frost formed on the outdoor heat exchanger 23 has been removed and no more frost removal is required is established in Step S21, a control to finish the frost removal operation is operated.

In Step S25, it is determined whether or not the HVAC unit 5 is in the half-inside-air mode.

When it is determined that the HVAC unit 5 is in the half-inside-air mode in Step S25, the process proceeds to Step S26. On the other hand, when it is determined that the HVAC unit 5 is not in the half-inside-air mode, in other words, when it is determined that the HVAC unit 5 is in the inside-air circulation mode, the process proceeds to Step S27.

In Step S26, the mode of the HVAC unit 5 that has been switched to the half-inside-air mode in Step S23 is returned to the outside-air intake mode. Then, in Step S27, the operation mode of the refrigeration cycle 2 that has been switched to the dehumidifying cabin-heating mode in Step S24 is returned to the heat pump cabin-heating mode. By doing so, an air-conditioning mode can be returned to the air-conditioning mode desired by the passenger in the vehicle cabin.

According to the first embodiment described above, the advantages described below are afforded.

The air-conditioning device 100 includes: the compressor 21 configured to compress the refrigerant; the outdoor heat exchanger 23 configured to perform the heat exchange between the refrigerant and the outside air; the evaporator 25 configured to evaporate the refrigerant by causing the refrigerant to absorb the heat of the air to be guided to the vehicle cabin of the vehicle; the heater core 42 configured to heat the air to be guided to the vehicle cabin by using the heat of the refrigerant compressed by the compressor 21; the liquid receiver 24 arranged at the downstream side of the outdoor heat exchanger 23, the liquid receiver 24 being configured to separate the refrigerant guided from the outdoor heat exchanger 23 into the liquid-state refrigerant and the gaseous-state refrigerant and to store the liquid-state refrigerant; the fixed restrictor 27 provided between the heater core 42 and the outdoor heat exchanger 23, the fixed restrictor 27 being configured to cause the refrigerant to be decompressed and expanded; the thermostatic expansion valve 26 provided between the outdoor heat exchanger 23 and the evaporator 25, the thermostatic expansion valve 26 being configured to cause the refrigerant that has passed through the outdoor heat exchanger 23 to be decompressed and expanded, wherein, in the operation state in which the flow of the refrigerant is restricted by the fixed restrictor 27 and the heat is released in the heater core 42, the heat pump cabin-heating mode and the dehumidifying cabin-heating mode are switched, the heat pump cabin-heating mode being set such that the liquid-state refrigerant is stored in the liquid receiver 24 and the gaseous-state refrigerant is guided to the compressor 21 and the dehumidifying cabin-heating mode being set such that the liquid-state refrigerant stored in the liquid receiver 24 is guided to the heater core 42.

According to such a configuration, in the operation state in which the flow of the refrigerant is restricted by the fixed restrictor 27 and the heat is released in the heater core 42, the heat pump cabin-heating mode and the dehumidifying cabin-heating mode are switched with each other. In the heat pump cabin-heating mode, while performing the cabin-heating operation, the liquid-state refrigerant obtained from the refrigerant guided from the outdoor heat exchanger 23 is stored in the liquid receiver 24. In the dehumidifying cabin-heating mode, the liquid-state refrigerant stored in the liquid receiver 24 in the heat pump cabin-heating mode is guided to the evaporator 25. Thus, by switching the heat pump cabin-heating mode and the dehumidifying cabin-heating mode, it is possible to store the liquid-state refrigerant in the liquid receiver 24 and to perform the dehumidification by using thus-stored liquid-state refrigerant, while performing the cabin-heating operation. Therefore, it is possible to perform the dehumidifying cabin-heating operation in which the dehumidification is performed while maintaining the cabin-heating state.

In addition, at time of starting the air-conditioning device 100, when the operation, in which the flow of the refrigerant is restricted by the fixed restrictor 27 and the heat is released in the fluid-cooled condenser 22, is performed, the operation is started in the heat pump cabin-heating mode.

According to such a configuration, for example, when the air-conditioning device 100 is started at the time of cold-start, by first operating the refrigeration cycle 2 in the heat pump cabin-heating mode, it is possible to store the liquid-state refrigerant in the liquid receiver 24.

In addition, in the liquid receiver 24, a first liquid receiver 241 and a second liquid receiver 242 in a second embodiment which will be described below are configured integrally so as to have the liquid reservoir 24a storing the liquid-state refrigerant in common. At the time of the cabin-heating operation, the liquid receiver 24 guides the gaseous-state refrigerant, which has entered from the outdoor heat exchanger 23, to the compressor 21, and at the time of the cabin-cooling operation, the liquid receiver 24 guides the liquid-state refrigerant, which has entered from the outdoor heat exchanger 23, to the evaporator 25.

In the above, in a case in which the operation mode of the refrigeration cycle 2 is switched from the heat pump cabin-heating mode to the cabin-cooling mode in order to perform the dehumidification, the flow paths through which the refrigerant circulates differ between the heat pump cabin-heating mode and the cabin-cooling mode. Thus, because there is a difference between the refrigerant pressures in the respective flow paths in the heat pump cabin-heating mode and in the cabin-cooling mode, there is a risk in that the noise is caused when the flow paths for the refrigerant are switched.

In contrast, the air-conditioning device 100 is provided with the liquid receiver 24 that guides the gaseous-state refrigerant, which has entered from the outdoor heat exchanger 23, to the compressor 21 at the time of the cabin-heating operation, and that guides the liquid-state refrigerant, which has entered from the outdoor heat exchanger 23, to the thermostatic expansion valve 26 at the time of the cabin-cooling operation. Therefore, when the flow of the refrigerant in the refrigeration cycle 2 is switched in order to switch the heat pump cabin-heating mode to the dehumidifying cabin-heating mode, the pressure difference between the upstream side and the downstream side of the first flow-path switching valve 28 is small and the liquid-state refrigerant that has been stored at the time of the heat pump cabin-heating mode is guided from the liquid receiver 24 to the thermostatic expansion valve 26, and therefore, the noise is less likely to be generated.

In addition, the air-conditioning device 100 includes: the compressor 21 configured to compress the refrigerant; the outdoor heat exchanger 23 configured to perform the heat exchange between the refrigerant and the outside air; the evaporator 25 configured to evaporate the refrigerant by causing the refrigerant to absorb the heat of the air to be guided to the vehicle cabin of the vehicle; the heater core 42 configured to heat the air to be guided to the vehicle cabin by using the heat of the refrigerant compressed by the compressor 21; the thermostatic expansion valve 26 provided between the outdoor heat exchanger 23 and the evaporator 25, the thermostatic expansion valve 26 being configured to cause the refrigerant that has passed through the outdoor heat exchanger 23 to be decompressed and expanded; the fixed restrictor 27 provided between the compressor 21 and the outdoor heat exchanger 23, the fixed restrictor 27 being configured to cause the refrigerant that has been compressed by the compressor 21 to be decompressed and expanded; the liquid receiver 24 configured to separate the liquid-state refrigerant and the gaseous-state refrigerant from each other, to guide the gaseous-state refrigerant, which has entered from the outdoor heat exchanger 23, to the compressor 21 at the time of the cabin-heating operation, and to guide the liquid-state refrigerant, which has entered from the outdoor heat exchanger 23, to the thermostatic expansion valve 26 at the time of the cabin-cooling operation; the first flow-path switching valve 28 configured to switch the flow paths of the refrigerant such that the thermostatic expansion valve 26 and the evaporator 25 are bypassed at the time of the cabin-heating operation; and the second flow-path switching valve 29 configured to switch the flow paths of the refrigerant such that the fixed restrictor 27 is bypassed at the time of the cabin-cooling operation, wherein: in the dehumidifying cabin-heating operation, the heat pump cabin-heating mode and the dehumidifying cabin-heating mode are switched alternately, the heat pump cabin-heating mode being set such that the first flow-path switching valve 28 is switched such that the refrigerant bypasses the thermostatic expansion valve 26 and the evaporator 25 and the second flow-path switching valve 29 is switched such that the refrigerant passes through the fixed restrictor 27 and the dehumidifying cabin-heating mode being set such that the first flow-path switching valve 28 is switched such that the refrigerant passes through the thermostatic expansion valve 26 and the evaporator 25 and the second flow-path switching valve 29 is switched such that the refrigerant passes through the fixed restrictor 27.

In the heat pump cabin-heating mode, the fluid-cooled condenser 22 performs the heat exchange between the high-pressure refrigerant that has been discharged from the compressor 21 and the air to be guided to the vehicle cabin via the hot-water cycle 4, the refrigerant that has been lead out from the fluid-cooled condenser 22 is decompressed and expanded by the fixed restrictor 27, the refrigerant that has been decompressed and expanded by the fixed restrictor 27 flows into the outdoor heat exchanger 23, the liquid receiver 24 separates the low-pressure refrigerant that has been lead out from the outdoor heat exchanger 23 into the gaseous-state refrigerant and the liquid-state refrigerant, and the gaseous-state refrigerant is guided to the compressor 21.

On the other hand, in the dehumidifying cabin-heating mode, the fluid-cooled condenser 22 performs the heat exchange between the high-pressure refrigerant that has been discharged from the compressor 21 and the air to be guided to the vehicle cabin via the hot-water cycle 4, the refrigerant that has been lead out from the fluid-cooled condenser 22 is decompressed and expanded by the fixed restrictor 27, the intermediate-pressure refrigerant that has been decompressed and expanded by the fixed restrictor 27 flows into the outdoor heat exchanger 23, the liquid receiver 24 separates the refrigerant that has been lead out from the outdoor heat exchanger 23 into the gaseous-state refrigerant and the liquid-state refrigerant, the thermostatic expansion valve 26 causes the liquid-state refrigerant that has been lead out from the liquid receiver 24 to be decompressed and expanded, the evaporator 25 evaporates the refrigerant by performing the heat exchange between the low-pressure refrigerant that has been decompressed and expanded by the thermostatic expansion valve 26 and the air to be guided to the vehicle cabin, and the gaseous-state refrigerant is guided to the compressor 21.

According to such a configuration, at the time of the dehumidifying cabin-heating operation, the heat pump cabin-heating mode and the dehumidifying cabin-heating mode are switched alternately. In the dehumidifying cabin-heating mode, the first flow-path switching valve 28 is switched such that the refrigerant passes through the thermostatic expansion valve 26, and the second flow-path switching valve 29 is switched such that the refrigerant passes through the fixed restrictor 27. In a case in which the heat pump cabin-heating mode and the dehumidifying cabin-heating mode are switched, the pressure fluctuation range and the temperature fluctuation range are small as compared with those in a case in which the heat pump cabin-heating mode and the cabin-cooling mode are switched. Therefore, when the dehumidifying cabin-heating operation is performed, it is possible to suppress the generation of noise caused by switching the paths of the refrigerant in the refrigeration cycle 2.

In addition, the air-conditioning device 100 is provided with an expansion valve provided between the outdoor heat exchanger 23 and the evaporator 25, the expansion valve being configured to cause the refrigerant that has passed through the outdoor heat exchanger 23 to be decompressed and expanded, and the expansion valve is the thermostatic expansion valve 26 configured such that the opening degree is adjusted based on the temperature of the refrigerant that has passed through the evaporator 25.

According to such a configuration, when the refrigeration cycle 2 is operated in the cabin-cooling mode or in the dehumidifying cabin-heating mode, because only the gaseous-state refrigerant can be guided to the compressor 21, there is no need to further provide an accumulator on the upstream side of the compressor 21.

In addition, the air-conditioning device 100 further includes the internal heat exchanger 30 configured to perform the heat exchange between the refrigerant on the upstream side of the thermostatic expansion valve 26 and the evaporator 25 and the refrigerant on the downstream side of the thermostatic expansion valve 26 and the evaporator 25.

According to such a configuration, the liquid-state refrigerant that has been lead out from the liquid receiver 24 is subjected to the heat exchange with the low-temperature gaseous-state refrigerant while flowing through the internal heat exchanger 30, and the liquid-state refrigerant reaches the supercooled state with the degree of supercooling from the saturated liquid state by being supercooled by the gaseous-state refrigerant. Thus, by providing the internal heat exchanger 30, the liquid-state refrigerant is likely to be guided to the thermostatic expansion valve 26.

In addition, the air-conditioning device 100 further includes the differential pressure regulating valve 31 configured to open when the pressure of the refrigerant to be guided to the evaporator 25 exceeds the set pressure at the time of the cabin-cooling operation.

According to such a configuration, it is possible to prevent the refrigerant from flowing into the evaporator 25 from the liquid receiver 24 through the thermostatic expansion valve 26 at the time of the cabin-heating operation (the heat pump cabin-heating mode). Thus, it is possible to prevent the evaporator 25 from being frozen and to prevent the lubricating oil flowing in the refrigerant flow path 20 from being stored in the evaporator 25.

In addition, the outdoor heat exchanger 23 has the refrigerant inlet 23a through which the refrigerant is lead in and the refrigerant outlet 23b provided at the position higher than the refrigerant inlet 23a, the refrigerant outlet 23b being configured such that the refrigerant is lead out therethrough.

According to such a configuration, at the time of the cabin-heating operation, when the heat exchange between the outside air and the refrigerant is performed in the outdoor heat exchanger 23, the refrigerant, which has not been evaporated (the refrigerant with high humidity), in the outdoor heat exchanger 23 is less likely to be lead out therefrom, and an amount of heat absorbed from the outside air is increased.

In addition, the heat pump cabin-heating mode and the dehumidifying cabin-heating mode are switched alternately such that the temperature of the air that has passed along the evaporator 25 varies within the pre-set appropriate range.

In addition, the heat pump cabin-heating mode and the dehumidifying cabin-heating mode are switched alternately at the period of from 5 seconds to 70 seconds.

According to the above-described configurations, in a case in which the heat pump cabin-heating mode and the dehumidifying cabin-heating mode are switched alternately at the period of from 5 seconds to 70 seconds, the temperature of the air that has passed along the evaporator 25 varies within the pre-set appropriate range, and therefore, it is possible to allow the dehumidification performance to be exhibited sufficiently while avoiding the freezing of the evaporator 25. In addition, at this time, because the average temperature of the air that has passed along the heater core 42 is also maintained within the appropriate temperature range, the cabin-heating performance is prevented from being lowered. Therefore, by alternately switching the heat pump cabin-heating mode and the dehumidifying cabin-heating mode at the period of from 5 seconds to 70 seconds, it is possible to perform the dehumidifying cabin-heating operation.

In addition, the heat pump cabin-heating mode and the dehumidifying cabin-heating mode are switched alternately at the period of from 12 seconds to 55 seconds.

In addition, the heat pump cabin-heating mode and the dehumidifying cabin-heating mode are switched alternately at the period of from 15 seconds to 50 seconds.

According to the above-described configurations, because the temperature of the air that has passed along the evaporator 25 varies within the pre-set desirable range or within the pre-set more desirable range, it is possible to allow the dehumidification performance to be exhibited more sufficiently while avoiding the freezing of the evaporator 25.

In addition, when the temperature $T_E$ of the evaporator 25 is equal to or lower than the first set temperature $T_{E1}$ in the dehumidifying cabin-heating mode, the operation mode is switched to the heat pump cabin-heating mode, and when the temperature of the evaporator 25 is equal to or higher than the second set temperature $T_{E2}$ in the dehumidifying cabin-heating modes, the operation mode is switched to the second operation mode, the second set temperature $T_{E2}$ being set so as to be higher than the first set temperature $T_{E1}$.

According to such a configuration, the temperature of the evaporator 25 varies between the first set temperature $T_{E1}$ and the second set temperature $T_{E2}$, and therefore, it is possible to allow the dehumidification performance to be exhibited sufficiently while avoiding the freezing of the evaporator 25. Therefore, by alternately switching the heat pump cabin-heating mode and the dehumidifying cabin-heating mode such that the temperature $T_E$ of the evaporator 25 varies between the first set temperature $T_{E1}$ and the second set temperature $T_{E2}$, it is possible to perform the dehumidifying cabin-heating operation.

In addition, the air-conditioning device 100 is configured such that the operation mode can be switched to the cabin-cooling mode, the cabin-cooling mode being set such that, in a state in which the flow of the refrigerant is not restricted by the fixed restrictor 27, the refrigerant is evaporated in the evaporator 25 and storage of the liquid-state refrigerant to the liquid receiver 24 is promoted, wherein when a state in which the temperature $T_E$ of the evaporator 25 does not fall below first set temperature $T_{E1}$ is continued in the dehumidifying cabin-heating mode, the operation mode is switched to the cabin-cooling mode.

In addition, the air-conditioning device 100 further includes the evaporator temperature sensor 13 configured to detect the temperature of the evaporator 25, wherein when the divergence between the temperature detected by the evaporator temperature sensor 13 and the first set temperature $T_{E1}$ is equal to or greater than a in the dehumidifying cabin-heating mode, the operation mode is switched to the cabin-cooling mode.

In addition, the air-conditioning device 100 further includes the evaporator temperature sensor 13 configured to detect the temperature of the evaporator 25, wherein when the time period during which there is the divergence between the temperature detected by the evaporator temperature sensor 13 and the first set temperature $T_{E1}$ becomes equal to or longer than the set time $t_p$ in the dehumidifying cabin-heating mode, the operation mode is switched to the cabin-cooling mode.

According to the above-described configurations, even if the temperature $T_E$ of the evaporator 25 cannot be lowered to the temperature equal to or lower than the first set temperature $T_{E1}$ any more, it is possible to avoid a situation in which the operation mode of the refrigeration cycle 2 is held to the dehumidifying cabin-heating mode and becomes unable to be switched, and therefore, it is possible to allow the operation mode of the refrigeration cycle 2 to be shifted to a state capable of performing the dehumidification.

In addition, the air-conditioning device 100 is configured such that the operation mode can be switched to the cabin-cooling mode, the cabin-cooling mode being set such that, in a state in which the flow of the refrigerant is not restricted by the fixed restrictor 27, the refrigerant is evaporated in the evaporator 25 and storage of the liquid-state refrigerant to the liquid receiver 24 is promoted, wherein when the operation mode is switched from the heat pump cabin-heating mode to the cabin-cooling mode, the operation mode is switched via the dehumidifying cabin-heating mode.

According to such a configuration, in the dehumidifying cabin-heating mode, because the refrigerant is flowing in the evaporator 25, when the dehumidifying cabin-heating mode is switched to the cabin-cooling mode, only the second flow-path switching valve 29 needs to be switched. At this time, the flow of the refrigerant in the evaporator 25 stays the same. In addition, in the dehumidifying cabin-heating mode, the pressure difference between the upstream side and the downstream side of the fixed restrictor 27 is small as compared with the pressure difference in the heat pump cabin-heating mode. Thus, when the operation mode is switched from the heat pump cabin-heating mode to the cabin-cooling mode, by switching the modes via the dehumidifying cabin-heating mode, it is possible to switch the operation mode of the refrigeration cycle 2 smoothly.

In addition, the air-conditioning device 100 further includes the frost formation determination unit 18 that determines that the frost formation has been caused on the outdoor heat exchanger 23, wherein when the frost formation determination unit 18 determined that the frost formation has been caused on the outdoor heat exchanger 23, the operation mode is switched from the heat pump cabin-heating mode to the dehumidifying cabin-heating mode.

In addition, in the air-conditioning device 100, when the frost formation determination unit 18 determined that the frost formation has been caused on the outdoor heat exchanger 23, if the HVAC unit 5 is in the outside-air intake mode in which the air outside the vehicle cabin is taken in and used for the air-conditioning, the mode of the HVAC unit 5 is switched to the half-inside-air mode in which the air outside the vehicle cabin is used for the air-conditioning by being mixed with the air inside the vehicle cabin.

According to the above-described configurations, when the frost formation determination unit 18 determined that the frost formation has been caused on the outdoor heat exchanger 23, the operation mode of the refrigeration cycle 2 is switched from the heat pump cabin-heating mode to the dehumidifying cabin-heating mode. In addition, in a case in which the HVAC unit 5 is in the outside-air intake mode in which the air outside the vehicle cabin is taken in and used for the air-conditioning, the mode is switched to the half-inside-air mode in which the air outside the vehicle cabin is used for the air-conditioning by being mixed with the air inside the vehicle cabin. As described above, by operating the refrigeration cycle 2 in the dehumidifying cabin-heating mode in a state in which the mode of the HVAC unit 5 has been switched to the half-inside-air mode, it is possible to remove the frost formed on the outdoor heat exchanger 23.

Second Embodiment

An air-conditioning device 200 according to the second embodiment of the present invention will be described below with reference to FIGS. 14 to 16. In each of the embodiments shown below, differences from the first embodiment will be mainly described, and components that have similar functions are assigned the same reference numerals and descriptions thereof will be omitted.

Figure 14:
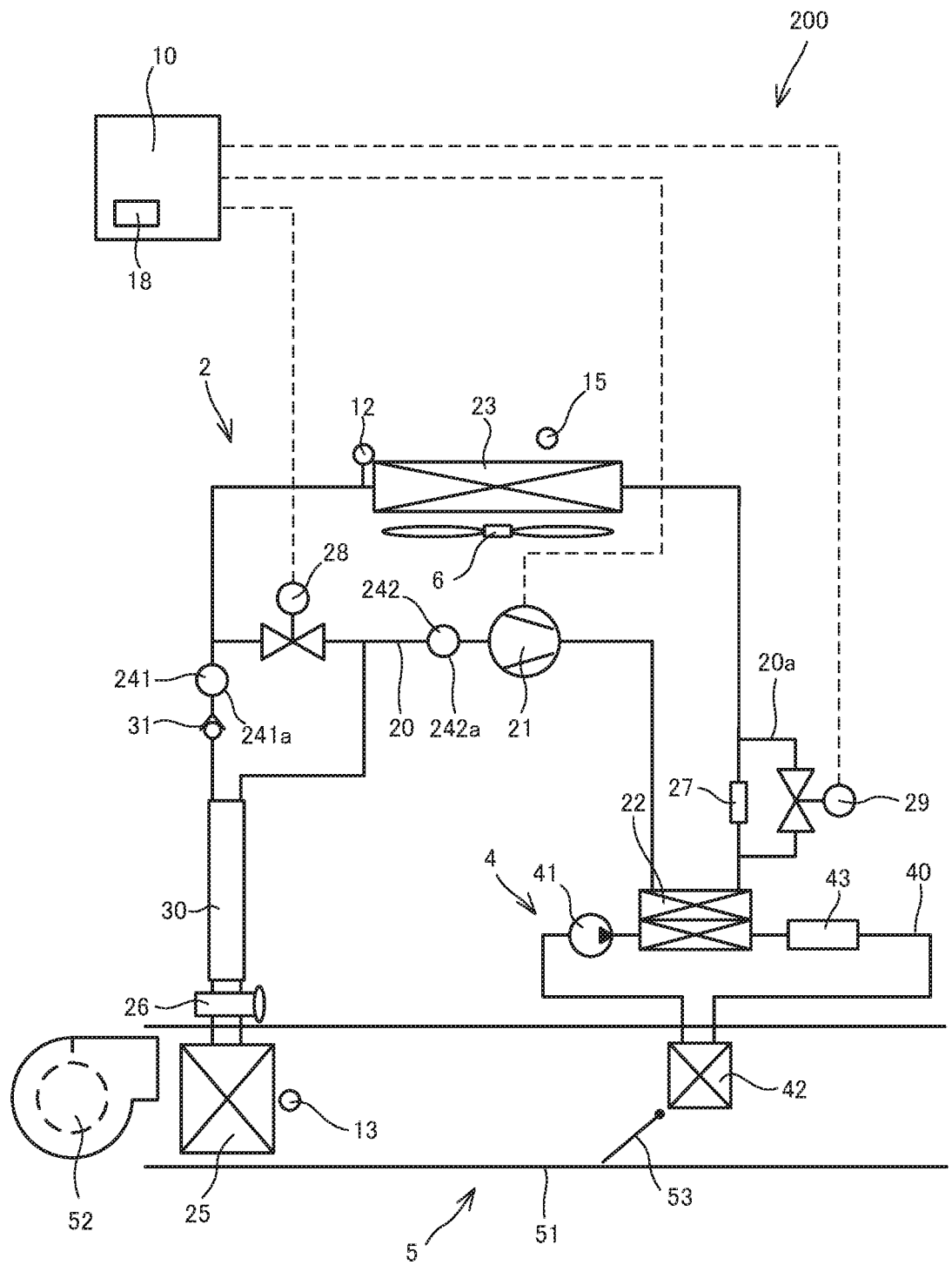
FIG. 14 is a configuration diagram of the air-conditioning device according to a second embodiment of the present invention.

As shown in FIG. 14, the air-conditioning device 200 differs from the air-conditioning device 100 according to the first embodiment in that the first liquid receiver 241 and the second liquid receiver 242 are separately provided instead of the single liquid receiver 24.

The first liquid receiver 241 is arranged at the downstream side of the outdoor heat exchanger 23. The first liquid receiver 241 separates the refrigerant guided from the outdoor heat exchanger 23 into the liquid-state refrigerant and the gaseous-state refrigerant. The first liquid receiver 241 has a first liquid reservoir 241a for storing the liquid-state refrigerant.

The second liquid receiver 242 is arranged at the upstream side of the compressor 21. The second liquid receiver 242 temporarily stores the refrigerant flowing through the refrigerant flow path 20 and performs the gas/liquid separation into the gaseous-state refrigerant and the liquid-state refrigerant. The second liquid receiver 242 has a second liquid reservoir 242a for storing the liquid-state refrigerant. Only the separated gaseous-state refrigerant flows to the compressor 21 from the second liquid receiver 242.

As described above, in this embodiment, the air-conditioning device 200 is provided with the two liquid reservoirs 241a and 242a that are positioned on the downstream side of the outdoor heat exchanger 23, to which the refrigerant from the outdoor heat exchanger 23 is guided, and that perform the gas/liquid separation into the liquid-state refrigerant and the gaseous-state refrigerant and stores the liquid-phase refrigerant. The first liquid reservoir 241a has an outlet that leads out the liquid-state refrigerant obtained by subjecting the refrigerant to the gas/liquid separation, and the second liquid reservoir 242a has an outlet that leads out the gaseous-state refrigerant obtained by subjecting the refrigerant to the gas/liquid separation.

In the heat pump cabin-heating mode, the refrigerant guided from the outdoor heat exchanger 23 is guided to the second liquid reservoir 242a and the gaseous-state refrigerant is guided to the compressor 21; however, at this time, a part of the liquid-state refrigerant obtained from the refrigerant from the outdoor heat exchanger 23 is guided to and stored in the first liquid reservoir 241a.

On the other hand, in the dehumidifying cabin-heating mode, the refrigerant guided from the outdoor heat exchanger 23 is guided to the first liquid reservoir 241a, and the liquid-state refrigerant is guided to the evaporator 25 through the internal heat exchanger 30 and the thermostatic expansion valve 26. Then, from the refrigerant lead out from the evaporator 25, the gaseous-state refrigerant is guided to the compressor 21 through the second liquid reservoir 242a.

At the time of the dehumidifying cabin-heating operation, the operation mode of the refrigeration cycle 2 is switched alternately between the heat pump cabin-heating mode serving as the first operation mode and the dehumidifying cabin-heating mode serving as the second operation mode. In the heat pump cabin-heating mode, the refrigerant in the refrigeration cycle 2 and the hot water in the hot-water cycle 4 circulate as shown by the thick solid lines in FIG. 15. In the dehumidifying cabin-heating mode, the refrigerant in the refrigeration cycle 2 and the hot water in the hot-water cycle 4 circulate as shown by the thick solid lines in FIG. 16.

Figure 15:
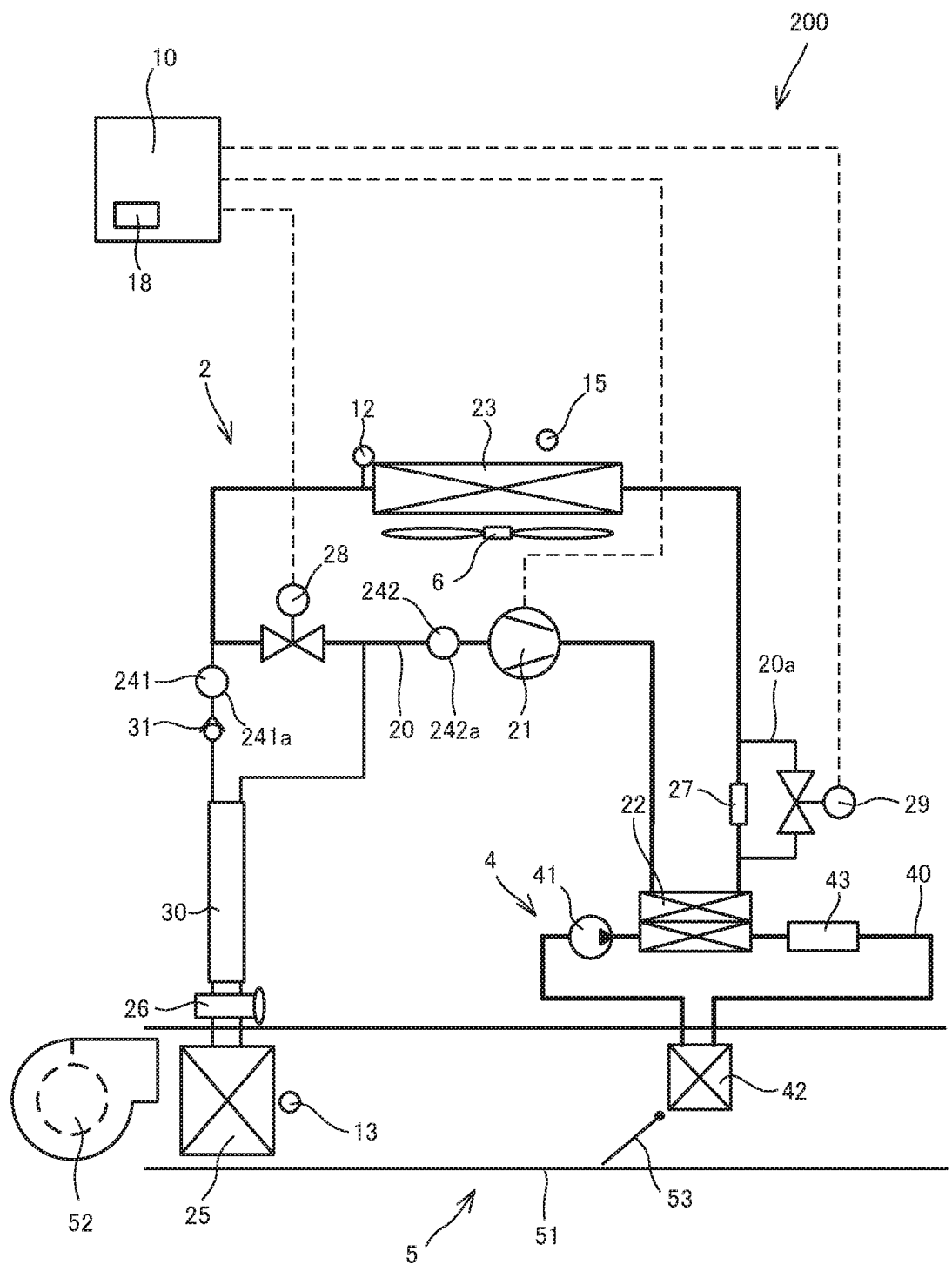
FIG. 15 is a diagram for explaining the flow of the refrigerant of the air-conditioning device in the heat pump cabin-heating mode at the time of the cabin-heating operation and the dehumidifying cabin-heating operation.

As shown in FIG. 15, in the heat pump cabin-heating mode, the controller 10 opens the first flow-path switching valve 28 and closes the second flow-path switching valve 29.

The refrigerant that has become high temperature by being compressed in the compressor 21 flows to the fluid-cooled condenser 22. The refrigerant that has reached the fluid-cooled condenser 22 heats the hot water within the fluid-cooled condenser 22, becomes low temperature by being decompressed and expanded by flowing through the fixed restrictor 27, and flows to the outdoor heat exchanger 23.

The refrigerant that has reached the outdoor heat exchanger 23 is subjected to the heat exchange with the outside air introduced to the outdoor heat exchanger 23, and thereafter, the refrigerant flows into the second liquid receiver 242 through the first flow-path switching valve 28. The gaseous-state refrigerant obtained from the refrigerant subjected to the gas/liquid separation in the second liquid receiver 242 flows again to the compressor 21; however, at this time, a part of the refrigerant from the outdoor heat exchanger 23 is guided to and stored in the first liquid reservoir 241a.

On the other hand, the hot water that has been heated with the refrigerant in the fluid-cooled condenser 22 circulates and flows into the heater core 42, thereby heating the surrounding air of the heater core 42. Thus-heated air flows towards the downstream side of the HVAC unit 5 and is used as the cabin-heating wind.

Figure 16:
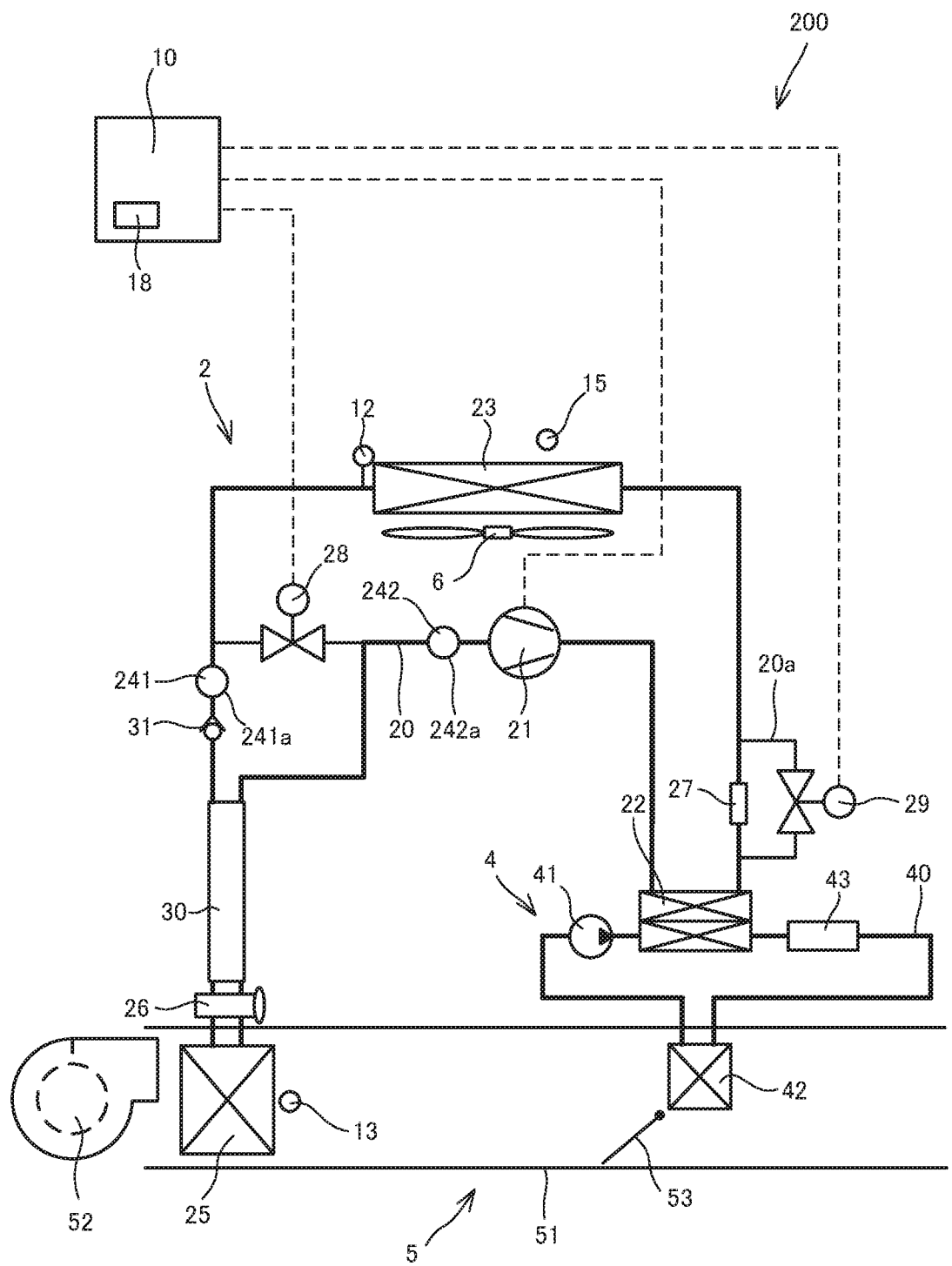
FIG. 16 is a diagram for explaining the flow of the refrigerant of the air-conditioning device in the dehumidifying cabin-heating mode at the time of the dehumidifying cabin-heating operation.

As shown in FIG. 16, in the dehumidifying cabin-heating mode, the controller 10 closes the first flow-path switching valve 28 and closes the second flow-path switching valve 29.

The refrigerant that has become high temperature by being compressed in the compressor 21 flows to the fluid-cooled condenser 22. The refrigerant that has reached the fluid-cooled condenser 22 heats the hot water within the fluid-cooled condenser 22, becomes low temperature by being decompressed and expanded by flowing through the fixed restrictor 27, and flows to the outdoor heat exchanger 23.

The refrigerant that has reached the outdoor heat exchanger 23 is subjected to the heat exchange with the outside air introduced to the outdoor heat exchanger 23, and thereafter, the refrigerant is subjected to the gas/liquid separation in the first liquid receiver 241. Then, the liquid-state refrigerant stored in the first liquid receiver 241 in the heat pump cabin-heating mode and the liquid-state refrigerant obtained from the gas/liquid separation performed in the first liquid receiver 241 flow via the internal heat exchanger 30. As described above, in the dehumidifying cabin-heating mode, the liquid-state refrigerant stored in the first liquid receiver 241 is guided to the evaporator 25.

Thereafter, the liquid-state refrigerant is decompressed and expanded by the thermostatic expansion valve 26 and flows into the evaporator 25. While passing through the evaporator 25, the liquid-state refrigerant is evaporated by absorbing the heat of the air to be used for the air-conditioning. The gaseous-state refrigerant that has been obtained by the evaporation in the evaporator 25 passes through the internal heat exchanger 30 and flows again into the compressor 21 through the second liquid receiver 242.

The air flows towards the downstream side of the HVAC unit 5 is used as the dehumidifying cabin-heating wind by being dehumidified by the evaporator 25 and being heated by the heater core 42.

As described above, also in the second embodiment, similarly to the first embodiment, in the operation state in which the flow of the refrigerant is restricted by the fixed restrictor 27 and the heat is released in the heater core 42, the mode is switched between the heat pump cabin-heating mode and the dehumidifying cabin-heating mode. In the heat pump cabin-heating mode, while performing the cabin-heating operation, the liquid-state refrigerant is stored in the first liquid receiver 241. In the dehumidifying cabin-heating mode, the liquid-state refrigerant stored in the first liquid receiver 241 in the heat pump cabin-heating mode is guided to the evaporator 25. Thus, by switching the heat pump cabin-heating mode and the dehumidifying cabin-heating mode, it is possible to store the liquid-state refrigerant in the first liquid receiver 241 while performing the cabin-heating operation, and it is possible to perform the dehumidification by using thus stored liquid-state refrigerant. Therefore, it is possible to perform the dehumidifying cabin-heating operation in which the dehumidification is performed while maintaining the cabin-heating state.

Although the embodiments of the present invention have been described in the above, the above-mentioned embodiments merely illustrate a part of application examples of the present invention, and the technical scope of the present invention is not intended to be limited to the specific configurations in the above-mentioned embodiments.

The invention claimed is:

1. An air-conditioning device mounted on a vehicle comprising:
    a compressor configured to compress a refrigerant;
    an outdoor heat exchanger configured to perform heat exchange between the refrigerant and outside air;
    an evaporating unit configured to evaporate the refrigerant by causing the refrigerant to absorb heat of air to be guided to a vehicle cabin of the vehicle;
    a heater unit configured to heat the air to be guided to the vehicle cabin by using the heat of the refrigerant compressed by the compressor;
    a liquid receiver arranged at a downstream side of the outdoor heat exchanger, the liquid receiver being configured to separate the refrigerant guided from the outdoor heat exchanger into a liquid-phase refrigerant and a gaseous-phase refrigerant and to store the liquid-phase refrigerant;
    a restrictor mechanism provided between the heater unit and the outdoor heat exchanger, the restrictor mechanism being configured to cause the refrigerant to be decompressed and expanded;
    an expansion valve provided between the outdoor heat exchanger and the evaporating unit, the expansion valve being configured to cause the refrigerant that has passed through the outdoor heat exchanger to be decompressed and expanded;
    a first flow-path switching valve configured to switch flow paths of the refrigerant such that the expansion valve and the evaporating unit are bypassed; and
    a second flow-path switching valve configured to switch the flow paths of the refrigerant such that the restrictor mechanism is bypassed, wherein
    the restrictor mechanism is a fixed restrictor having a fixed amount of restriction,
    the air-conditioning device performs a cabin-heating operation, a cabin-cooling operation, and a dehumidifying cabin-heating operation,
        the cabin-heating operation being set such that the refrigerant is subjected to heat absorption in the outdoor heat exchanger, a flow of the refrigerant is restricted by the restrictor mechanism by closing the second flow-path switching valve, the refrigerant bypasses the expansion valve and the evaporating unit by opening the first flow-path switching valve, and heat is released in the heater unit;
        the cabin-cooling operation being set such that the refrigerant is subjected to heat release in the outdoor heat exchanger, the refrigerant bypasses the restrictor mechanism by opening the second flow-path switching valve, and the refrigerant is evaporated in the evaporating unit by closing the first flow-path switching valve; and
        the dehumidifying cabin-heating operation being set such that a first operation mode and a second operation mode are switched alternately,
            the first operation mode being set such that the flow of the refrigerant is restricted by the restrictor mechanism by closing the second flow-path switching valve, the refrigerant bypasses the expansion valve and the evaporating unit by opening the first flow-path switching valve, heat is released in the heater unit, and the liquid-phase refrigerant is stored in the liquid receiver and the gaseous-phase refrigerant is guided to the compressor, and
            the second operation mode being set such that the flow of the refrigerant is restricted by the restrictor mechanism by closing the second flow-path switching valve, heat is released in the heater unit, and the liquid-phase refrigerant stored in the liquid receiver is guided to the evaporating unit by closing the first flow-path switching valve.

2. The air-conditioning device according to claim 1, wherein
at a time of starting the air-conditioning device, when an operation, in which the flow of the refrigerant is restricted by the restrictor mechanism and heat is released in the heater unit, is performed, the operation is started in the first operation mode.

3. The air-conditioning device according to claim 1, wherein
the expansion valve is a thermostatic expansion valve configured such that an opening degree is adjusted based on temperature of the refrigerant that has passed through the evaporating unit.

4. The air-conditioning device according to claim 1, further comprising:
an internal heat exchanger configured to perform heat exchange between the refrigerant on an upstream side of the evaporating unit and the refrigerant on a downstream side of the evaporating unit.

5. The air-conditioning device according to claim 1, further comprising:
a differential pressure regulating valve configured to open when pressure of the refrigerant to be guided to the evaporating unit exceeds set pressure at a time of the cabin-cooling operation.

6. The air-conditioning device according to claim 1, wherein
the outdoor heat exchanger has:
a refrigerant inlet through which the refrigerant is lead in; and
a refrigerant outlet provided at a position higher than the refrigerant inlet, the refrigerant outlet being configured such that the refrigerant is lead out therethrough.

7. The air-conditioning device according to claim 1, wherein
in the first operation mode:
the heater unit performs heat exchange between high-pressure refrigerant discharged from the compressor and air to be guided to the vehicle cabin;
the restrictor mechanism causes the refrigerant lead out from the heater unit to be decompressed and expanded;
the refrigerant that has been decompressed and expanded by the restrictor mechanism flows into the outdoor heat exchanger;
the liquid receiver separates low-pressure refrigerant that has been lead out from the outdoor heat exchanger into the gaseous-phase refrigerant and the liquid-phase refrigerant; and
the gaseous-phase refrigerant is guided to the compressor, and
in the second operation mode:
the heater unit performs heat exchange between the high-pressure refrigerant discharged from the compressor and the air to be guided to the vehicle cabin;
the restrictor mechanism causes the refrigerant lead out from the heater unit to be decompressed and expanded;
intermediate-pressure refrigerant that has been decompressed and expanded by the restrictor mechanism flows into the outdoor heat exchanger;
the liquid receiver separates the refrigerant that has been lead out from the outdoor heat exchanger into the gaseous-phase refrigerant and the liquid-phase refrigerant;
the expansion valve causes the liquid-phase refrigerant guided from the liquid receiver to be decompressed and expanded;
the evaporating unit evaporates the refrigerant by performing heat exchange between the low-pressure refrigerant that has been decompressed and expanded by the expansion valve and the air to be guided to the vehicle cabin; and
the gaseous-phase refrigerant is guided to the compressor.

8. The air-conditioning device according to claim 1, wherein
the first operation mode and the second operation mode are switched alternately such that temperature of air that has passed along the evaporating unit varies within a pre-set appropriate range.

9. The air-conditioning device according to claim 1, wherein
the first operation mode and the second operation mode are switched alternately at a period of from 5 seconds to 70 seconds.

10. The air-conditioning device according to claim 1, wherein
the first operation mode and the second operation mode are switched alternately at a period of from 12 seconds to 55 seconds.

11. The air-conditioning device according to claim 1, wherein
the first operation mode and the second operation mode are switched alternately at a period of from 15 seconds to 50 seconds.

12. The air-conditioning device according to claim 1, wherein
when temperature of the evaporating unit is equal to or lower than a first set temperature in the second operation mode, the second operation mode is switched to the first operation mode, and when the temperature of the evaporating unit is equal to or higher than a second set temperature in the first operation mode, the first operation mode is switched to the second operation mode, the second set temperature being set so as to be higher than the first set temperature.

13. The air-conditioning device according to claim 12, wherein
the air-conditioning device is configured such that an operation mode can be switched to a third operation mode, the third operation mode being set such that, in a state in which the flow of the refrigerant is not restricted by the restrictor mechanism, the refrigerant is evaporated in the evaporating unit and storage of the liquid-phase refrigerant to the liquid receiver is promoted, and
when a state in which the temperature of the evaporating unit does not fall below the first set temperature is continued in the second operation mode, the operation mode is switched to the third operation mode.

14. The air-conditioning device according to claim 13, further comprising:
an evaporating unit temperature detector configured to detect the temperature of the evaporating unit, wherein
when there is a divergence between temperature detected by the evaporating unit temperature detector and the first set temperature in the second operation mode, the operation mode is switched to the third operation mode.

15. The air-conditioning device according to claim 13, further comprising:
an evaporating unit temperature detector configured to detect the temperature of the evaporating unit, wherein
when a time period during which there is a divergence between the temperature detected by the evaporating unit temperature detector and the first set temperature becomes equal to or longer than set time in the second operation mode, the operation mode is switched to the third operation mode.

16. The air-conditioning device according to claim 13, wherein
in the third operation mode, the first flow-path switching valve is switched such that the refrigerant passes through the expansion valve and the evaporating unit, and the second flow-path switching valve is switched such that the refrigerant bypasses the restrictor mechanism.

17. The air-conditioning device according to claim 13, wherein
in the third operation mode:
a high-pressure refrigerant discharged from the compressor passes through the heater unit;
the high-pressure refrigerant that has passed through the heater unit flows into the outdoor heat exchanger;
the liquid receiver separates the refrigerant that has been lead out from the outdoor heat exchanger into the gaseous-phase refrigerant and the liquid-phase refrigerant and stores the liquid-phase refrigerant;
the expansion valve causes the liquid-phase refrigerant guided from the liquid receiver to be decompressed and expanded;
the evaporating unit evaporates the refrigerant by performing the heat exchange between a low-pressure refrigerant that has been decompressed and expanded by the expansion valve and the air to be guided to the vehicle cabin; and
the gaseous-phase refrigerant is guided to the compressor.

18. The air-conditioning device according to claim 1, wherein
the air-conditioning device is configured such that an operation mode can be switched to a third operation mode, the third operation mode being set such that, in a state in which the flow of the refrigerant is not restricted by the restrictor mechanism, the refrigerant is evaporated in the evaporating unit and storage of the liquid-phase refrigerant to the liquid receiver is promoted, and
when the operation mode is switched from the first operation mode to the third operation mode, the operation mode is switched via the second operation mode.

19. The air-conditioning device according to claim 1, further comprising:
a frost formation determination unit that determines that a frost formation has been caused on the outdoor heat exchanger, wherein
when the frost formation determination unit determined that the frost formation has been caused on the outdoor heat exchanger, the first operation mode is switched from the first operation mode to the second operation mode.

20. The air-conditioning device according to claim 19, wherein
when the frost formation determination unit determined that the frost formation has been caused on the outdoor heat exchanger, if a mode is in an outside-air intake mode in which air outside the vehicle cabin is taken in and used for air-conditioning, the mode is switched to a half-inside-air mode in which the air outside the vehicle cabin is used for the air-conditioning by being mixed with air inside the vehicle cabin.

* * * * *